US010910861B2

(12) United States Patent
Tian et al.

(10) Patent No.: US 10,910,861 B2
(45) Date of Patent: Feb. 2, 2021

(54) CHARGING SYSTEM, CHARGING METHOD, AND POWER ADAPTER

(71) Applicant: GUANGDONG OPPO MOBILE TELECOMMUNICATIONS CORP., LTD., Guangdong (CN)

(72) Inventors: Chen Tian, Guangdong (CN); Jialiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 142 days.

(21) Appl. No.: 16/308,008

(22) PCT Filed: Apr. 6, 2017

(86) PCT No.: PCT/CN2017/079634
§ 371 (c)(1),
(2) Date: Dec. 7, 2018

(87) PCT Pub. No.: WO2018/184178
PCT Pub. Date: Oct. 11, 2018

(65) Prior Publication Data
US 2019/0260218 A1 Aug. 22, 2019

(51) Int. Cl.
*H02J 7/02* (2016.01)
*H02J 7/04* (2006.01)
(Continued)

(52) U.S. Cl.
CPC .......... *H02J 7/022* (2013.01); *H02J 7/00711* (2020.01); *H02J 7/045* (2013.01); *H02M 1/08* (2013.01);
(Continued)

(58) Field of Classification Search
USPC ........................................................ 320/107
See application file for complete search history.

(56) References Cited

U.S. PATENT DOCUMENTS

2012/0161717 A1* 6/2012 Li ..................... H02J 7/022
320/145
2013/0300375 A1* 11/2013 Von Novak ........... H02J 7/00
320/137
(Continued)

FOREIGN PATENT DOCUMENTS

CN 101854114 10/2010
CN 106026327 10/2016
(Continued)

OTHER PUBLICATIONS

EPO, Office Action for EP Application No. 17904385, dated Mar. 8, 2019.
(Continued)

*Primary Examiner* — Mohammed Alam
(74) *Attorney, Agent, or Firm* — Hodgson Russ LLP

(57) ABSTRACT

The present disclosure provides a charging system, a power adapter and a charging method. The power adapter includes a first rectifier, a switch unit, a transformer, a second rectifier, a first current sampling circuit, a first capacitor bank and a second capacitor bank, and a control unit. The control unit is configured to output a control signal to the switch unit, and determine an output current of the power adapter according to a current sampling value sampled by the first current sampling circuit when the power adapter enters a first charging mode, wherein, the control unit is configured to isolate the first capacitor bank when the output current of the power adapter is at a rising edge or a falling edge, and enable the first capacitor bank to work when the output current of the power adapter is at a platform segment.

20 Claims, 14 Drawing Sheets

(51) Int. Cl.
*H02M 1/08* (2006.01)
*H02J 7/00* (2006.01)
*H02M 3/335* (2006.01)
*H02M 3/337* (2006.01)
*H02M 1/00* (2006.01)
*H02M 1/32* (2007.01)

(52) U.S. Cl.
CPC ......... *H02J 7/00034* (2020.01); *H02J 7/027* (2013.01); *H02M 3/3376* (2013.01); *H02M 3/33507* (2013.01); *H02M 3/33546* (2013.01); *H02M 3/33569* (2013.01); *H02M 2001/0009* (2013.01); *H02M 2001/0032* (2013.01); *H02M 2001/327* (2013.01)

(56) References Cited

U.S. PATENT DOCUMENTS

| 2015/0180356 | A1* | 6/2015 | Norisada | B60L 53/22 363/17 |
|---|---|---|---|---|
| 2019/0260218 | A1* | 8/2019 | Tian | H02J 7/022 |

FOREIGN PATENT DOCUMENTS

| CN | 106100083 | 11/2016 |
|---|---|---|
| CN | 205882812 | 1/2017 |
| EP | 3249780 | 11/2017 |
| WO | 2015166559 | 11/2015 |

OTHER PUBLICATIONS

JPO, Office Action for JP Application No. 2019502090, dated Dec. 6, 2019.

WIPO, ISR for PCT/CN2017/079634, Jan. 5, 2018.

KIPO, Office Action for KR Application No. 1020197005198, dated Sep. 23, 2020.

* cited by examiner

CHARGING SYSTEM, CHARGING METHOD, AND POWER ADAPTER

CROSS-REFERENCE TO RELATED APPLICATION

This application is a U.S. national phase application of International Application No. PCT/CN2017/079634, filed on Apr. 6, 2017, the entire disclosure of which is incorporated herein by reference.

TECHNICAL FIELD

The present disclosure generally relates to a terminal device technology field, and more particularly, to a power adapter, a charging system and a charging method for a terminal.

BACKGROUND

A mobile terminal is typically charged by a power adapter. A secondary side of the power adapter is usually provided with a solid capacitor as an output capacitor for voltage stabilization and filtering. However, a service life of the solid capacitor is greatly related to temperature rising during using.

In the related art, there is no need to provide an electrolytic capacitor at a primary side of the power adapter, and the power adapter can charge the mobile terminal with high power pulse. Since there is no electrolytic capacitor at the primary side, the output capacitor (solid capacitor) at the secondary side would release overall energy when an input power of the power adapter is at a valley, such that intense charging and discharging occurs in one pulse period. Further, the greater the charging and discharging current is, the greater the current ripple is, which results in that the temperature rising of the solid capacitor becomes very high, greatly influencing the service life thereof.

When it is required for the solid capacitor to support such large charging and discharging current, it needs to set a capacitance value of the solid capacitor very large, which further occupies great space, and is disadvantageous for miniaturization design of the power adapter. If the secondary side of the power adapter is not provided with the solid capacitor, filtering effect would become worse when the power adapter charges the mobile terminal with high power pulse, which results in large switching ripple of the output signal, and affects the charging effect.

SUMMARY

The present disclosure aims to solve one of technical problems in the related art to at least some extent.

For this, a first objective of the present disclosure is to provide a power adapter, which may effectively reduce temperature rising, prolong a service life, and moreover may reduce a volume, which is advantageous for miniaturization design.

A second objective of the present disclosure is to provide a charging system. A third objective of the present disclosure is to provide a charging method for a terminal.

To achieve above objectives, a power adapter provided in embodiments of a first aspect of the present disclosure includes: a first rectifier, configured to rectify input alternating current to output a first voltage with a first pulsating waveform; a switch unit, configured to modulate the first voltage with the first pulsating waveform according to a control signal; a transformer, configured to output a second voltage with a second pulsating waveform according to modulated first voltage with the first pulsating waveform; a second rectifier, configured to rectify the second voltage with the second pulsating waveform to output a third voltage with a third pulsating waveform; a first current sampling circuit, configured to perform a current sampling on the third voltage with the third pulsating waveform to obtain a current sampling value; a first capacitor bank and a second capacitor bank, each being coupled to an output end of the second rectifier; and a control unit, coupled to the first current sampling circuit and the switch unit respectively, and configured to output the control signal to the switch unit, and determine an output current of the power adapter according to the current sampling value when the power adapter enters a first charging mode. The control unit is configured to isolate the first capacitor bank when the output current of the power adapter is at a rising edge or a falling edge, and the control unit is configured to enable the first capacitor bank to work when the output current of the power adapter is at a platform segment.

According to the power adapter of embodiments of the present disclosure, by providing the first capacitor bank and the second capacitor bank at the output end of the second rectifier, and by performing current sampling on the output of the second rectifier with the first current sampling circuit, the output current of the power adapter is determined according to the current sampling value when the power adapter enters the first charging mode. When the output current of the power adapter is at the rising edge or the falling edge, the control unit isolates the first capacitor bank, to prevent it from intense charging and discharging, which may effectively reduce the temperature rising and prolong the service life. When the output current of the power adapter is at the platform segment, the control unit enables the first capacitor bank to work, and in this case, the first capacitor bank and the second capacitor bank work simultaneously, which greatly improves filtering effect, ensures that the power adapter operates stably and reliably, and improves charging effect.

To achieve above objectives, a charging system provided in embodiments of a second aspect of the present disclosure includes a terminal and a power adapter described above. The power adapter is configured to charge the terminal.

According to the charging system of embodiments of the present disclosure, by charging the terminal with the power adapter described above, the first capacitor bank is isolated when the output current of the power adapter is at the rising edge or the falling edge, thus preventing the power adapter from intense charging and discharging, which may effectively reduce the temperature rising, and prolong the service life. Moreover, the first capacitor bank is configured to only support the second charging mode of low power, and thus the first capacitor bank does not need to have a large capacitance value, which reduces the number and volume of capacitors, saves the volume of the power adapter, improves the power density and product expression, and is advantageous for miniaturization design of the power adapter.

To achieve above objectives, embodiments of a third aspect of the present disclosure provide a charging method for a terminal. The terminal is charged by a power adapter. A first capacitor bank and a second capacitor bank are coupled at a secondary side of the power adapter, and the charging method includes: performing a primary rectification on input alternating current to output a first voltage with a first pulsating waveform; modulating the first voltage with the first pulsating waveform by controlling a switch unit in the power adapter, and outputting a second voltage with a second pulsating waveform by conversion of a transformer; performing a secondary rectification on the second voltage with the second pulsating waveform to output a third voltage with a third pulsating waveform; performing a current sampling on an output of the secondary rectification to obtain a current sampling value, and determining an output current of the power adapter according to the current sampling value when the power adapter enters a first charging mode; isolating the first capacitor bank when the output current of the power adapter is at a rising edge or a falling edge; enabling the first capacitor bank to work when the output current of the power adapter is at a platform segment.

According to the charging method for the terminal of embodiments of the present disclosure, by providing the first capacitor bank and the second capacitor bank at the secondary side of the power adapter, and by performing current sampling on the output of the secondary rectification to obtain the current sampling value, the output current of the power adapter is determined according to the current sampling value when the power adapter enters the first charging mode, in which, when the current of the power adapter is at the rising edge or the falling edge, the first capacitor bank is isolated, preventing the power adapter from intense charging and discharging, which may effectively reduce the temperature rising and prolong the service life; when the current of the power adapter is at the platform segment, the first capacitor bank is enabled to work, such that the first capacitor bank and the second capacitor bank work simultaneously, greatly improving the filtering effect, ensuring stable and reliable operation of the power adapter, and improving the charging effect.

DETAILED DESCRIPTION

Figure 1A:
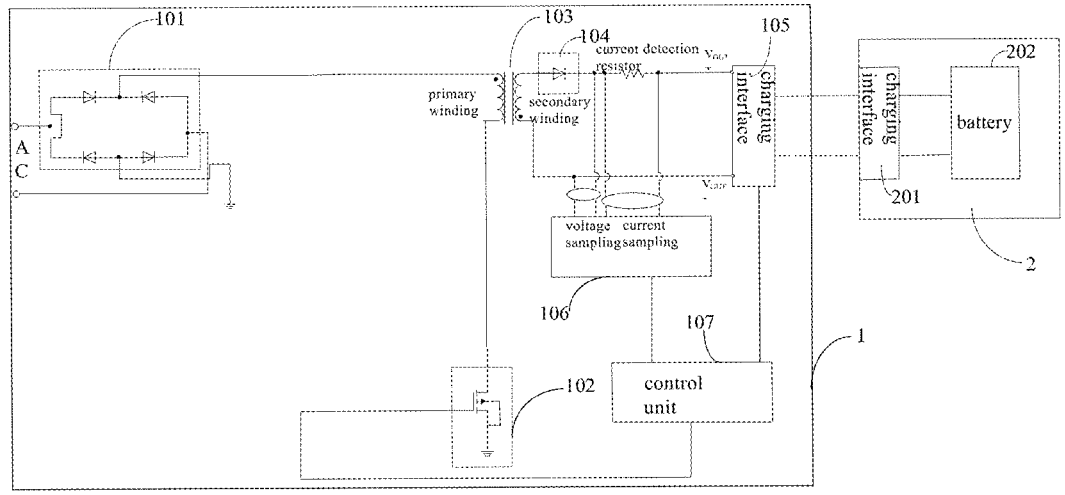
FIG. 1A is a schematic diagram of a charging system for a terminal using a flyback switching power supply according to an embodiment of the present disclosure.

Descriptions will be made in detail to embodiments of the present disclosure, examples of which are illustrated in drawings, in which the same or similar elements and the elements having same or similar functions are denoted by like reference numerals throughout the descriptions. The embodiments described herein with reference to drawings are explanatory, are intended to understand the present disclosure, and are not construed to limit the present disclosure.

At first, inventors of the present disclosure finds during research that, as power of a power adapter increases, it is easy to cause increasing of polarization resistance of a battery and higher temperature rising of the battery when the power adapter charges the battery of a mobile terminal, thus shortening a service life of the battery, and affecting reliability and safety of the battery.

Moreover, alternating current power supply is typically used to supply power. However, most devices cannot work directly using the alternating current, which is because the alternating current such as 220V mains supply of 50 Hz outputs electric energy discontinuously. In order to be not "discontinuous", an electrolytic condenser is typically used to store energy, such that when the power supply is at a valley, stable energy supply is maintained by energy storing of the electrolytic condenser. Thus, when the alternating current power supply charges the mobile terminal via the power adapter, the alternating current supplied by the alternating current power supply such as 220V alternating current is first converted to steady direct current for supply to the mobile terminal. However, the power adapter is configured to charge the battery of the mobile terminal, and therefore indirectly supply power to the mobile terminal, the continuity of which can be guaranteed by the battery. In this way, the power adapter does not need to output steady direct current continuously when charging the battery.

Therefore, there is no need to provide the electrolytic condenser at a primary side of the power adapter, and the power adapter can charge the mobile terminal with high power pulse, i.e., operate in a first charging mode, and moreover the power adapter can support a second charging mode.

Before describing the charging system, the power adapter and the charging method provided by embodiments of the present disclosure, the power adapter (hereinafter referred to as "related adapter") for charging a device to be charged such as the terminal is described.

When the related adapter operates in the constant voltage mode, the voltage outputted by the related adapter keeps substantially constant, for example, 5V, 9V, 12V or 20V.

The voltage outputted by the related adapter is not suitable for being directly applied to both ends of the battery. Instead, the voltage outputted by the related adapter needs to be converted by a conversion circuit in the device to be charged (such as the terminal), such that a charging voltage and/or a charging current expected by the battery in the device to be charged (such as the terminal) is obtained.

The conversion circuit is configured to convert the voltage outputted by the related adapter, to meet a requirement of the charging voltage and/or charging current expected by the battery.

As an example, the conversion circuit may be a charging management module, such as a charging integrated circuit (IC) in the terminal. During a charging process of the battery, the conversion circuit may be configured to manage the charging voltage and/or charging current of the battery. The conversion circuit may have at least one of a voltage feedback function and a current feedback function, so as to manage the charging voltage and/or charging current of the battery.

For example, the charging process of the battery may include at least one of a trickle charging stage, a constant current charging stage and a constant voltage charging stage. In the trickle charging stage, the conversion circuit may utilize a current feedback loop to ensure that a current flowing into the battery in the trickle charging stage meets the charging current (such as a first charging current) expected by the battery. In the constant current charging stage, the conversion circuit may utilize a current feedback loop to ensure that the current flowing into the battery in the constant current charging stage meets the charging current (such as a second charging current, which may be greater than the first charging current) expected by the battery. In the constant voltage charging stage, the conversion circuit may utilize a voltage feedback loop to ensure that a voltage applied to both ends of the battery in the constant voltage charging stage meets the charging voltage expected by the battery.

As an example, when the voltage outputted by the related adapter is greater than the charging voltage expected by the battery, the conversion circuit may be configured to perform a buck conversion on the voltage outputted by the related adapter to enable a buck-converted charging voltage to meet the requirement of the charging voltage expected by the battery. As another example, when the voltage outputted by the related adapter is less than the charging voltage expected by the battery, the conversion circuit may be configured to perform a boost conversion on the voltage outputted by the related adapter to enable a boost-converted charging voltage to meet the requirement of the charging voltage expected by the battery.

As another example, assume that the related adapter outputs a constant voltage of 5V. When the battery includes a single battery cell (such as a lithium battery cell, a charging cut-off voltage of a single battery cell is typically 4.2V), the conversion circuit (for example, a buck circuit) may perform a buck conversion on the voltage outputted by the related adapter, such that the charging voltage obtained after the buck conversion meets a requirement of the charging voltage expected by the battery.

As yet another example, assume that the related adapter outputs a constant voltage of 5V. When the related adapter charges a plurality of (two or more) battery cells (such as lithium battery cell, a charging cut-off voltage of a single battery cell is typically 4.2V) coupled in series, the conversion circuit (for example, a boost circuit) may perform a boost conversion on the voltage outputted by the related adapter, such that the charging voltage obtained after the boost conversion meets a requirement of the charging voltage expected by the battery.

Limited by a poor conversion efficiency of the conversion circuit, a part of electric energy is lost in a form of heat, and the heat may gather inside the device to be charged such as the terminal. A design space and a space for heat dissipation of the device to be charged such as the terminal are small (for example, the physical size of a mobile terminal used by a user becomes thinner and thinner, while plenty of electronic elements are densely arranged in the mobile terminal to improve performance of the mobile terminal), which not only increases difficulty in designing the conversion circuit, but also results in that it is hard to dissipate the heat gathered in the device to be charged such as the terminal in time, thus further causing an abnormity of the device to be charged such as the terminal.

For example, the heat gathered on the conversion circuit may cause a thermal interference on electronic elements neighboring the conversion circuit, thus causing abnormal operations of the electronic elements; and/or for another example, the heat gathered on the conversion circuit may shorten the service life of the conversion circuit and neighboring electronic elements; and/or for yet another example, the heat gathered on the conversion circuit may cause a thermal interference on the battery, thus causing abnormal charging and/or abnormal discharging of the battery; and/or for still another example, the heat gathered on the conversion circuit may increase the temperature of the device to be charged such as the terminal, thus affecting user experience during the charging; and/or for still yet another example, the heat gathered on the conversion circuit may short-circuit the conversion circuit, such that the voltage outputted by the related adapter is directly applied to both ends of the battery, thus causing abnormal charging of the battery, which brings safety hazard if the over-voltage charging lasts for a long time, for example, the battery may explode.

The power adapter provided by embodiments of the present disclosure can obtain status information of the battery. The status information of the battery at least includes electric quantity information and/or voltage information of the battery. The power adapter adjusts the voltage outputted by itself according to the obtained status information of the battery, to meet the requirement of the charging voltage and/or charging current expected by the battery. The voltage outputted by the power adapter after the adjustment may be directly applied to both ends of the battery for charging the battery, in which the power adapter outputs the voltage with pulsating waveform.

The power adapter has a voltage feedback function and a current feedback function, so as to manage the charging voltage and/or charging current of the battery.

The power adapter adjusts the voltage outputted by itself according to the obtained status information of the battery as follows. The power adapter may obtain the status information of the battery in real time, and adjust the voltage outputted by itself according to the status information of the battery obtained in real time, to meet the charging voltage and/or charging current expected by the battery.

The power adapter adjusts the voltage outputted by itself according to the status information of the battery obtained in real time as follows. During the charging process, with the increasing of the charging voltage of the battery, the power adapter may obtain status information of the battery at different time points in the charging process, and adjust the voltage outputted by itself in real time according to the status information of the battery at different time points in the charging process, to meet the requirement of the charging voltage and/or charging current expected by the battery. The voltage outputted by the power adapter after the adjustment can be directly loaded to both ends of the battery for charging the battery.

For example, the charging process of the battery may include one or more of a trickle charging stage, a constant current charging stage and a constant voltage charging stage. In the trickle charging stage, the power adapter may output the first charging current (the first charging current may be a current with a pulsating waveform) to charge the battery, so as to meet the requirement of the charging current expected by the battery. In the constant current charging stage, the power adapter may utilize a current feedback loop to ensure that the current outputted by the power adapter and flowing into the battery in the constant current charging stage meets the requirement of the charging current expected by the battery (such as a second charging current, which may also be a current with a pulsating waveform, and may be greater than the first charging current, which may mean that, a peak value of the current with the pulsating waveform in the constant current charging stage is greater than that of the current with the pulsating waveform in the trickle charging stage, while "constant current" of the constant current charging stage means that, in the constant current charging stage, a peak value or a mean value of the current with the pulsating waveform is basically constant). In the constant voltage charging stage, the power adapter may utilize a voltage feedback loop to ensure that a voltage (i.e., a voltage with a pulsating waveform) outputted by the power adapter to the device to be charged (such as the terminal) within the constant voltage charging stage is constant.

For example, the power adapter according to embodiments of the present disclosure is mainly configured to control the constant current charging stage of the battery in the device to be charged (such as the terminal). In other embodiments, the control on the trickle charging stage and the constant voltage charging stage of the battery in the device to be charged can be realized by the power adapter according to embodiments of the present disclosure in coordination with an additional charging chip in the device to be charged (such as the terminal). Compared to the constant current charging stage, the charging power received by the battery in the trickle charging stage and the constant voltage charging stage is smaller, such that the efficiency conversion loss and heat accumulation of the charging chip in the device to be charged (such as the terminal) is acceptable. It should be noted that, the constant current charging stage or the constant current mode involved in embodiments of the present disclosure may refer to a charging mode in which the current outputted by the power adapter is controlled. It is unnecessary to keep the current outputted by the power adapter completely constant. For example, the constant current may refer to that, a peak value or a mean value of the current with the pulsating waveform outputted by the power adapter is basically constant, or keeps constant during a certain time period. For example, in practice, the adapter typically adopts a multi-stage constant current mode for charging in the constant current charging stage.

The multi-stage constant current charging may include N constant current stages, where N is an integer no less than 2. The first charging stage of the multi-stage constant current charging starts with a predetermined charging current. N constant current stages in the multi-stage constant current charging are performed in sequence from the first charging stage to the $(N-1)^{th}$ charging stage. After the constant current charging is switched from one constant current stage to the next constant current stage, the peak value or mean value of the current with the pulsating waveform may be decreased. When the battery voltage reaches a charging stop voltage threshold, the constant current charging is switched from the present constant current stage to the next constant current stage. The current change between two adjacent constant current stages may be gradual, or may be in a stepped skip manner.

Further, it should be noted that, the "terminal" used in embodiments of the present disclosure includes, but is not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of a mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver.

In addition, in embodiments of the present disclosure, when the voltage with the pulsating waveform outputted by the power adapter is directly applied to the battery in the terminal to charge the battery, the charging current may be characterized by a pulsating waveform such as a steamed bun waveform and a trapezoidal waveform. It should be understood that, the charging current may be used to charge the battery intermittently. A period of the charging current may vary with a frequency of an input alternating current (such as a frequency of an alternating current power grid). For example, the frequency corresponding to the period of the charging current may be an integral multiple or a fraction of the frequency of the power grid. Moreover, when the charging current is used to charge the battery intermittently, a current waveform corresponding to the charging current may be formed of one pulse or a set of pulses synchronous to the power grid.

In the following, a charging system, a power adapter and a charging method for a terminal provided in embodiments of the present disclosure will be described with reference to drawings.

Referring to FIGS. 1A-14, the charging system provided in embodiments of the present disclosure includes a power adapter 1 and a terminal 2.

Figure 2A:
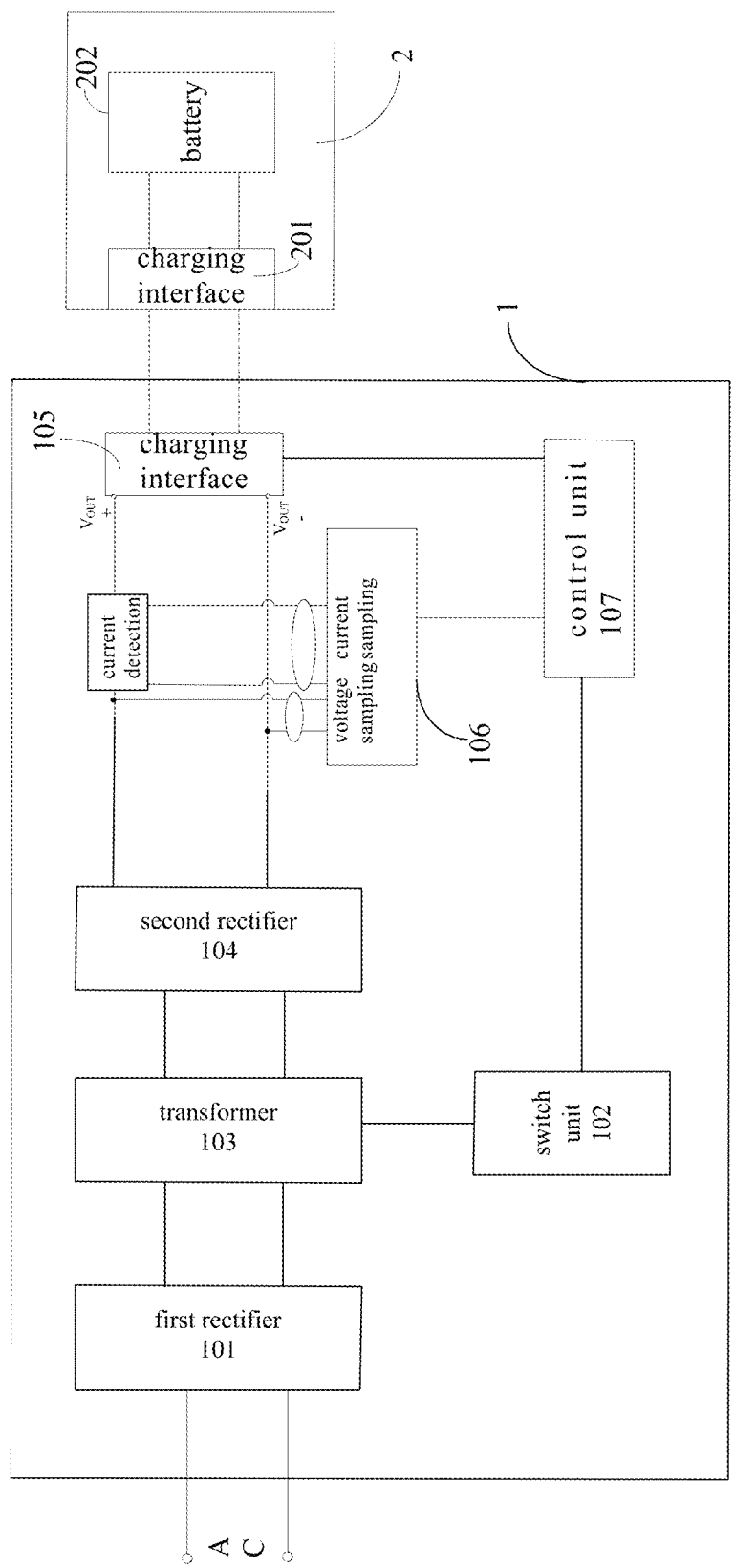
FIG. 2A is a schematic diagram of a charging system for a terminal according to an embodiment of the present disclosure.
Figure 2B:
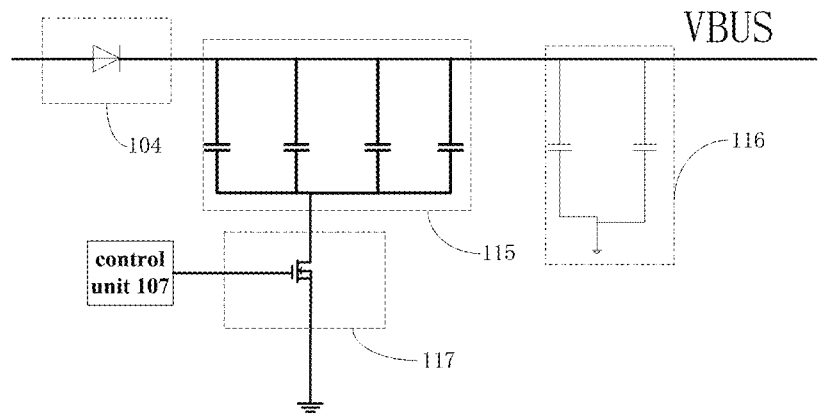
FIG. 2B is a schematic diagram illustrating a circuit at a secondary side of a power adapter according to an embodiment of the present disclosure.

As illustrated in FIG. 2A and FIG. 2B, the power adapter 1 includes a first rectifier 101, a switch unit 102, a transformer 103, a second rectifier 104, a first current sampling circuit 1061, a first capacitor bank 115, a second capacitor bank 116 and a control unit 117. The first rectifier 101 is configured to rectify an input alternating current (mains supply, for example AC 220V) to output a first voltage with a first pulsating waveform, for example a voltage with a steamed bun waveform. As illustrated in FIG. 1A, the first rectifier 101 may be a full-bridge rectifier circuit formed of four diodes. The switch unit 102 is configured to modulate the first voltage with the first pulsating waveform according to a control signal to output a modulated first voltage. The switch unit 102 may be formed of MOS transistors. A PWM (Pulse Width Modulation) control is performed on the MOS transistors to perform a chopping modulation on the voltage with the steamed bun waveform. The transformer 103 is configured to output a second voltage with a second pulsating waveform according to the modulated first voltage. The second rectifier 104 is configured to rectify the second voltage with the second pulsating waveform to output a third voltage with a third pulsating waveform. The second rectifier 104 may include a diode or a MOS transistor, and can realize a secondary synchronous rectification, such that the third pulsating waveform keeps synchronous with a waveform of the modulated first voltage. It should be noted that, the third pulsating waveform keeping synchronous with the waveform of the modulated first voltage means that, a phase of the third pulsating waveform is consistent with that of the waveform of the modulated first voltage, and a variation trend of magnitude of the third pulsating waveform is consistent with that of the waveform of the modulated first voltage. The first current sampling circuit 1061 is configured to perform current sampling on an output of the second rectifier 104 to obtain a current sampling value. Both the first capacitor bank 115 and the second capacitor bank 116 are coupled to an output end of the second rectifier 104. The control unit 107 is coupled to the first current sampling circuit 1061 and the switch unit 102 respectively, and the control unit 107 is configured to output the control signal to the switch unit 102, and to determine an output current of the power adapter according to the current sampling value when the power adapter enters the first charging mode. When the output current of the power adapter is at a rising edge or a falling edge, the control unit 107 is configured to isolate the first capacitor bank 115, thus preventing the first capacitor bank 115 from intense charging and discharging. When the output current of the power adapter is at the platform segment, the control unit 107 is configured to enable the first capacitor bank 115 to work, such that the first capacitor bank 115 and the second capacitor bank 116 perform filtering simultaneously.

Figure 2C:
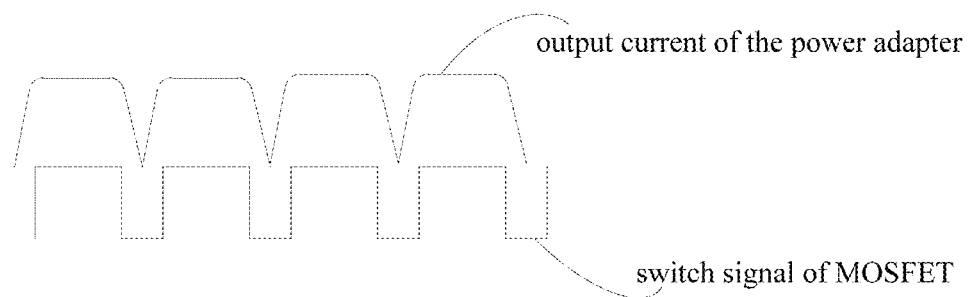
FIG. 2C is a schematic diagram illustrating waveforms of an output current of a power adapter and a switching signal of a selector switch.

By controlling the power adapter, the waveform of the output current of the power adapter can be adjusted, such that the current waveform of the power adapter is like the trapezoidal waveform, as illustrated in FIG. 2C. In embodiments of the present disclosure, the output current of the power adapter being at the platform segment refers to that, the waveform of the output current of the power adapter is at a stable and unchanging stage of the trapezoidal waveform.

When the output current of the power adapter is at the platform segment, the first capacitor bank 115 is put in circuit. In this case, the first capacitor bank cannot perceive external AC frequency ripple, and merely absorb high-frequency switch ripple, thus ensuring that the temperature rising of the first capacitor bank 115 may not be too high, and moreover improving filtering effect.

According to an embodiment of the present disclosure, as illustrated in FIG. 2B, the first capacitor bank 115 includes a plurality of solid capacitors C01 coupled in parallel, and the second capacitor bank 116 includes a plurality of ceramic capacitors coupled in parallel.

Moreover, as illustrated in FIG. 2B, the power adapter further includes a selector switch 117. A first end of the selector switch 117 is coupled to a first end of the first capacitor bank 115, a second end of the selector switch 117 is grounded, a control end of the selector switch 117 is coupled to the control unit 107, and a second end of the first capacitor bank 115 is coupled to the output end of the second rectifier 104.

In this way, when the output current of the power adapter is at the rising edge or the falling edge, the control unit 107 controls the selector switch 107 to switch off, such that the first capacitor bank 115 is removed from circuit. When the output current of the power adapter is at the platform segment, the control unit 107 controls the selector switch 107 to switch on, such that the first capacitor bank 115 is put in circuit.

According to an embodiment of the present disclosure, as illustrated in FIG. 2B, the selector switch 117 may be a MOS transistor.

In other words, when the power adapter enters the first charging mode (i.e., the fast charging mode), the control unit 107 controls the selector switch 117 such as MOSFET. When the output current of the power adapter is at the rising edge or the falling edge, the MOSFET is switched off, such that cathodes of solid capacitors in the first capacitor bank are disconnected from the ground GND to isolate the solid capacitors, and the ceramic capacitors in the second capacitor bank play a role in the filtering. When the output current of the power adapter is at the platform segment, the MOSFET is switched on, such that the solid capacitors in the first capacitor bank put in circuit, and also play a role in the filtering.

Waveforms of a switch signal of the MOSFET and the output current of the power adapter are as illustrated in FIG. 2C, in which the MOSFET is switched on at high levels, and switched off at low levels.

In an embodiment of the present disclosure, when the power adapter enters the second charging mode, the control unit 107 enables the first capacitor bank 115 to work, in which a charging speed of the first charging mode is greater than a charging speed of the second charging mode.

In other words, when the power adapter enters the second charging mode (i.e., the normal charging mode), the control unit 107 controls the selector switch 117 such as the MOSFET, i.e., switches on the MOSFET, to couple the cathodes of the solid capacitors in the first capacitor bank to ground GND, to enable the solid capacitors to work. In this case, the solid capacitors of the first capacitor bank and the ceramic capacitors of the second capacitor bank work simultaneously, and may provide a low-power 5V output. The solid capacitors mainly provide output power when the input voltage of the power adapter is at the valley. Since the output load of the power adapter is small, temperature rising of the solid capacitors is controllable. The ceramic capacitors of the second capacitor bank play a role in filtering out noise.

Therefore, in order to ensure that the power adapter can output direct current of 5V in the second charging mode, and can work with load, the solid capacitors of the first capacitor bank cannot be removed completely. In embodiments of the present disclosure, the power adapter adopts one MOSFET to enable the solid capacitors, such that the solid capacitors are in the working state when the power adapter is in the second charging mode, and are isolated when the output current of the power adapter is at the rising edge or the falling edge after the power adapter enters the first charging mode, thus preventing the solid capacitors from intense charging and discharge, and ensuring not too high temperature rising of the solid capacitors.

In conclusion, in embodiments of the present disclosure, the solid capacitors sensitive to temperature rising do not need to perform intense charging and discharging in the first charging mode, which can effectively reduce the temperature rising, and prolong the service life. Moreover, the solid capacitors are configured to merely support the second charging mode with low power, and thus the solid capacitors do not need to have a great capacitance value, reducing the number and volume of the capacitors, and reducing the size of the power adapter, which can improve power density and product expression, and is advantageous for miniaturization design of the power adapter.

According to the power adapter of embodiments of the present disclosure, by providing the first capacitor bank and the second capacitor bank at the output end of the second rectifier, and by performing current sampling on the output of the second rectifier with the first current sampling circuit, the output current of the power adapter is determined according to the current sampling value when the power adapter enters the first charging mode. When the output current of the power adapter is at the rising edge or the falling edge, the control unit isolates the first capacitor bank, to prevent it from intense charging and discharging, which may effectively reduce the temperature rising and prolong the service life. When the output current of the power adapter is at the platform segment, the control unit enables the first capacitor bank to work, and in this case, the first capacitor bank and the second capacitor bank work simultaneously, which greatly improves filtering effect, ensures that the power adapter operates stably and reliably, and improves charging effect.

In an embodiment of the present disclosure, as illustrated in FIG. 1A, the power adapter 1 may adopt a flyback switching power supply. In detail, the transformer 103 includes a primary winding and a secondary winding. An end of the primary winding is coupled to a first output end of the first rectifier 101. A second output end of the first rectifier 101 is grounded. Another end of the primary winding is coupled to the switch unit 102 (for example, if the switch unit 102 is a MOS transistor, the other end of the primary winding is coupled to a drain of the MOS transistor). The transformer 103 is configured to output a second voltage with a second pulsating waveform according to the modulated first voltage.

The transformer 103 is a high-frequency transformer of which a working frequency ranges from 50 KHz to 2 MHz. The high-frequency transformer is configured to couple the modulated first voltage to the secondary side so as to output via the secondary winding. In embodiments of the present disclosure, with the high-frequency transformer, a characteristic of a small size compared to the low-frequency transformer (also known as an industrial frequency transformer, mainly used in the frequency of mains supply such as alternating current of 50 Hz or 60 Hz) may be exploited to realize miniaturization of the power adapter 1.

Figure 1B:
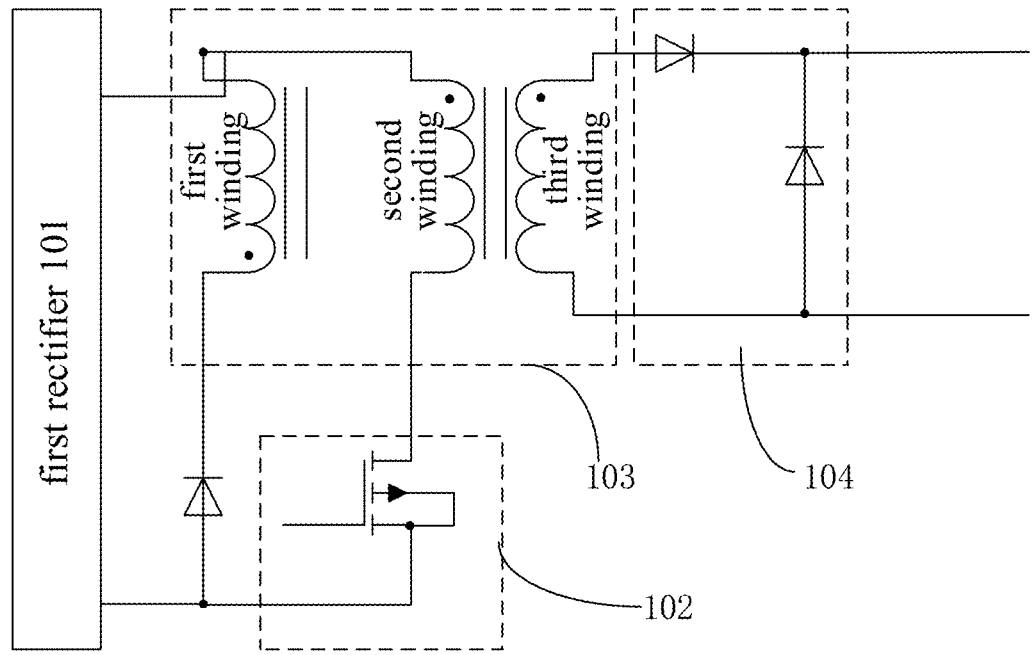
FIG. 1B is a schematic diagram of a charging system for a terminal using a positive switching power supply according to an embodiment of the present disclosure.

According to an embodiment of the present disclosure, as illustrated in FIG. 1B, the power adapter 1 may also adopt a forward switching power supply. In detail, the transformer 103 includes a first winding, a second winding and a third winding. A dotted terminal of the first winding is coupled to a second output end of the first rectifier 101 via a backward diode. A non-dotted terminal of the first winding is coupled to a dotted terminal of the second winding and then coupled to a first output end of the first rectifier 101. A non-dotted terminal of the second winding is coupled to the switch unit 102. The third winding is coupled to the second rectifier 104. The backward diode is configured to realize reverse peak clipping. An induced potential generated by the first winding may perform amplitude limiting on a reverse potential via the backward diode and return limited energy to an output of the first rectifier 101, so as to charge the output of the first rectifier 101. Moreover, a magnetic field generated by current flowing through the first winding may demagnetize a core of the transformer, so as to return magnetic field intensity in the core of the transformer to an initial state. The transformer 103 is configured to output the second voltage with the second pulsating waveform according to the modulated first voltage.

Figure 1C:
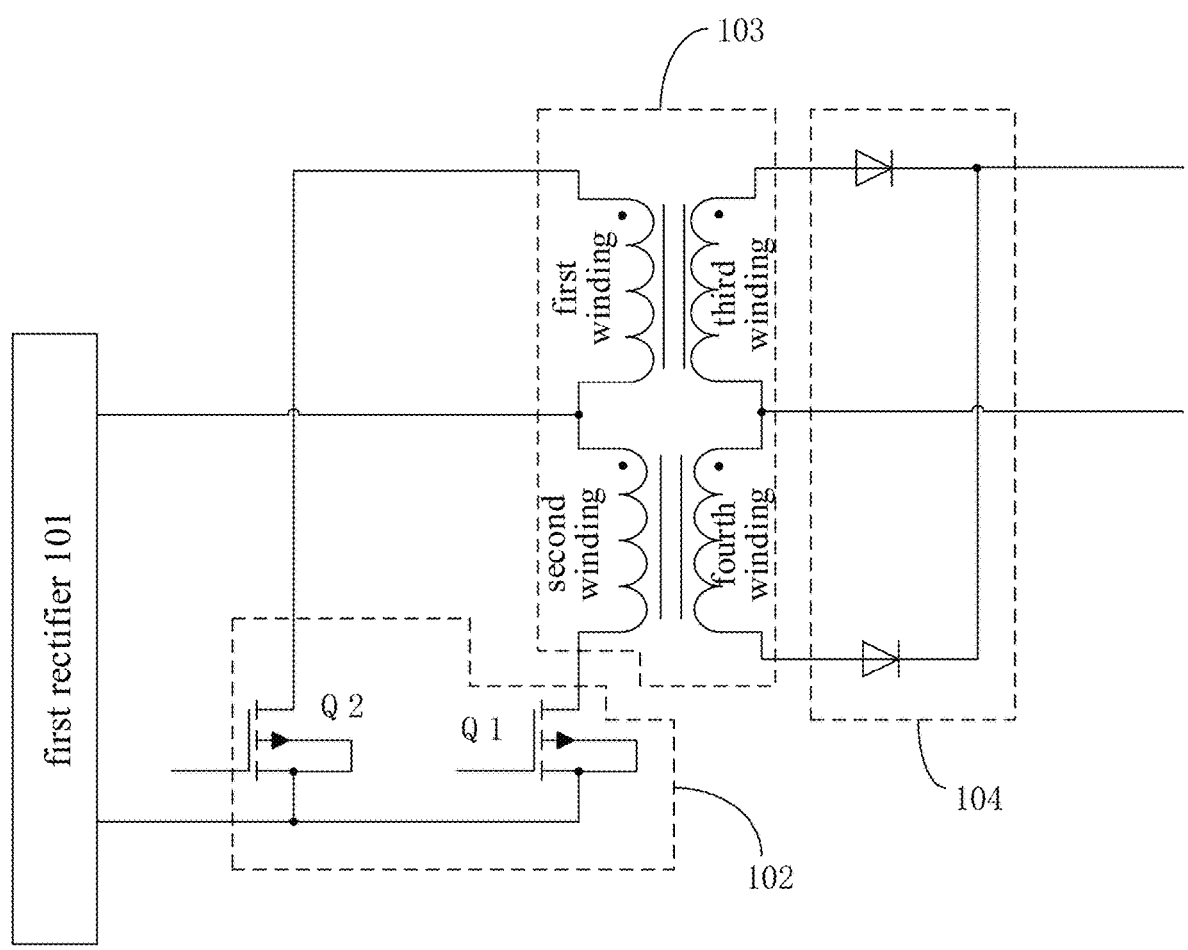
FIG. 1C is a schematic diagram of a charging system for a terminal using a push-pull switching power supply according to an embodiment of the present disclosure.

According to an embodiment of the present disclosure, as illustrated in FIG. 1C, the above-mentioned power adapter 1 may adopt a push-pull switching power supply. In detail, the transformer includes a first winding, a second winding, a third winding and a fourth winding. A dotted terminal of the first winding is coupled to the switch unit 102. A non-dotted terminal of the first winding is coupled to a dotted terminal of the second winding and then coupled to the first output end of the first rectifier 101. A non-dotted terminal of the second winding is coupled to the switch unit 102. A non-dotted terminal of the third winding is coupled to a dotted terminal of the fourth winding. The transformer is configured to output the second voltage with the second pulsating waveform according to the modulated first voltage.

As illustrated in FIG. 1C, the switch unit 102 includes a first MOS transistor Q1 and a second MOS transistor Q2. The transformer 103 includes a first winding, a second winding, a third winding and a fourth winding. A dotted terminal of the first winding is coupled to a drain of the first MOS transistor Q1 in the switch unit 102. A non-dotted terminal of the first winding is coupled to a dotted terminal of the second winding. A node between the non-dotted terminal of the first winding and the dotted terminal of the second winding is coupled to the first output end of the first rectifier 101. A non-dotted terminal of the second winding is coupled to a drain of the second MOS transistor Q2 in the switch unit 102. A source of the first MOS transistor Q1 is coupled to a source of the second MOS transistor Q2 and then coupled to the second output end of the first rectifier 101. A dotted terminal of the third winding is coupled to a first input end of the second rectifier 104. A non-dotted terminal of the third winding is coupled to a dotted terminal of the fourth winding. A node between the non-dotted terminal of the third winding and the dotted terminal of the fourth winding is grounded. A non-dotted terminal of the fourth winding is coupled to a second input end of the second rectifier 104.

As illustrated in FIG. 1C, the first input end of the second rectifier 104 is coupled to the dotted terminal of the third winding, and the second input end of the second rectifier 104 is coupled to the non-dotted terminal of the fourth winding. The second rectifier 104 is configured to rectify the second voltage with the second pulsating waveform and to output the third voltage with the third pulsating waveform. The second rectifier 104 may include two diodes. An anode of one diode is coupled to the dotted terminal of the third winding. An anode of another diode is coupled to a non-dotted terminal of the fourth winding. A cathode of one diode is coupled to that of the other diode.

Figure 1D:
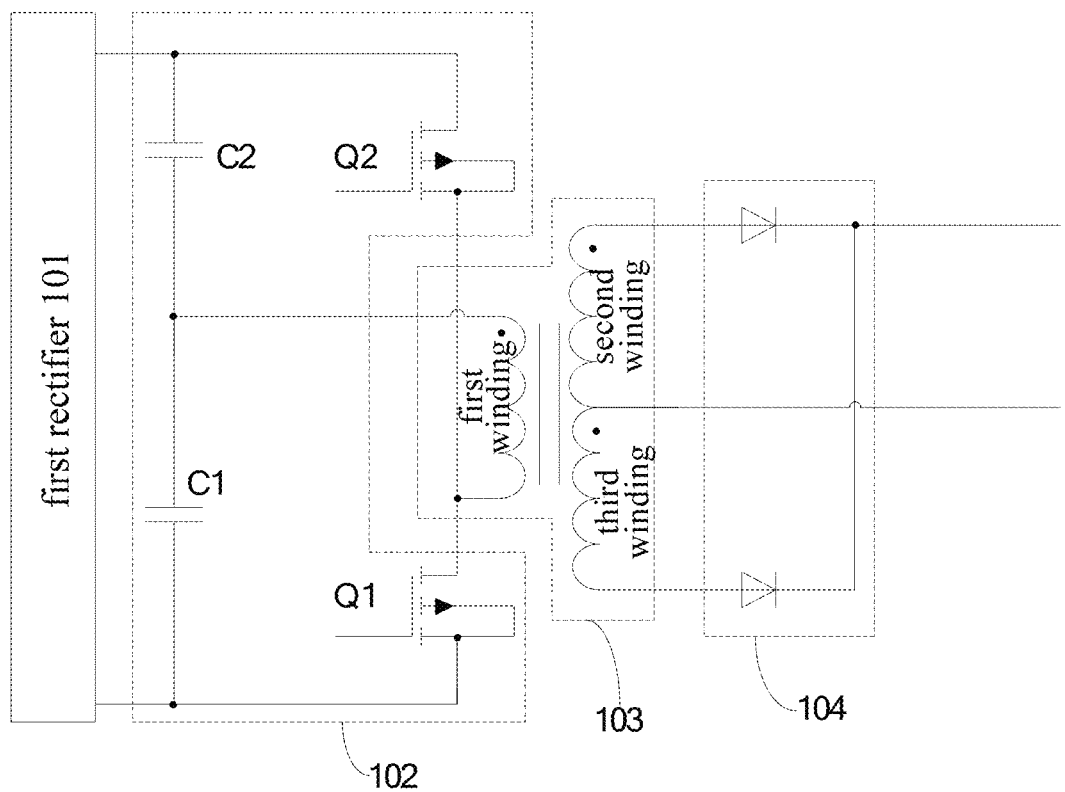
FIG. 1D is a schematic diagram of a charging system for a terminal using a half-bridge switching power supply according to an embodiment of the present disclosure.

According to an embodiment of the present disclosure, as illustrated in FIG. 1D, the above-mentioned power adapter 1 may also adopt a half-bridge switching power supply. In detail, the switch unit 102 includes a first MOS transistor Q1, a second MOS transistor Q2, a first capacitor C1 and a second capacitor C2. The first capacitor C1 and the second capacitor C2 are coupled in series, and then coupled in parallel to the output ends of the first rectifier 101. The first MOS transistor Q1 and the second MOS transistor Q2 are coupled in series, and then coupled in parallel to the output ends of the first rectifier 101. The transformer 103 includes a first winding, a second winding and a third winding. A dotted terminal of the first winding is coupled to a node between the first capacitor C1 and the second capacitor C2 coupled in series. A non-dotted terminal of the first winding is coupled to a node between the first MOS transistor Q1 and the second MOS transistor Q2 coupled in series. A dotted terminal of the second winding is coupled to the first input end of the second rectifier 104. A non-dotted terminal of the second winding is coupled to a dotted terminal of the third winding, and then grounded. A non-dotted terminal of the third winding is coupled to the second input end of the second rectifier 104. The transformer 103 is configured to output the second voltage with the second pulsating waveform according to the modulated first voltage.

Figure 1E:
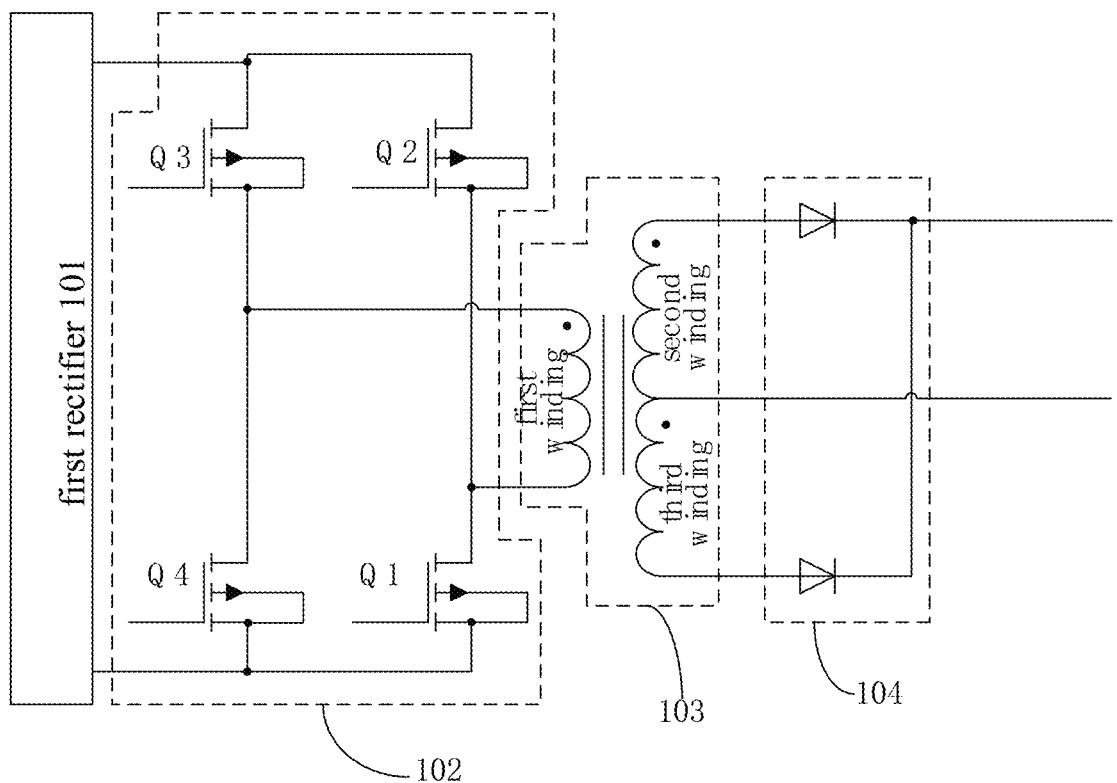
FIG. 1E is a schematic diagram of a charging system for a terminal using a full-bridge switching power supply according to an embodiment of the present disclosure.

According to an embodiment of the present disclosure, as illustrated in FIG. 1E, the above-mentioned power adapter 1 may also adopt a full-bridge switching power supply. In detail, the switch unit 102 includes a first MOS transistor Q1, a second MOS transistor Q2, a third MOS transistor Q3 and a fourth MOS transistor Q4. The third MOS transistor Q3 and the fourth MOS transistor Q4 are coupled in series and then coupled in parallel to the output ends of the first rectifier 101. The first MOS transistor Q1 and the second MOS transistor Q2 are coupled in series and then coupled in parallel to the output ends of the first rectifier 101. The transformer 103 includes a first winding, a second winding and a third winding. A dotted terminal of the first winding is coupled to a node between the third MOS transistor Q3 and the fourth MOS transistor Q4 coupled in series. A non-dotted terminal of the first winding is coupled to a node between the first MOS transistor Q1 and the second MOS transistor Q2 coupled in series. A dotted terminal of the second winding is coupled to the first input end of the second rectifier 104. A non-dotted terminal of the second winding is coupled to a dotted terminal of the third winding, and then grounded. A non-dotted terminal of the third winding is coupled to the second input end of the second rectifier 104. The transformer 103 is configured to output the second voltage with the second pulsating waveform according to the modulated first voltage.

Therefore, in embodiments of the present disclosure, the above-mentioned power adapter 1 may adopt any one of the flyback switching power supply, the forward switching power supply, the push-pull switching power supply, the half-bridge switching power supply and the full-bridge switching power supply to output the voltage with the pulsating waveform.

Further, in an embodiment of the present disclosure, as illustrated in FIG. 1A, the second rectifier 104 is coupled to the secondary winding of the transformer 103. The second rectifier 104 is configured to rectify the second voltage with the second pulsating waveform to output the third voltage with the third pulsating waveform. The second rectifier 104 may include a diode, and can realize a secondary synchronous rectification, such that the third pulsating waveform keeps synchronous with a waveform of the modulated first voltage. It should be noted that, the third pulsating waveform keeping synchronous with the waveform of the modulated first voltage means that, a phase of the third pulsating waveform is consistent with that of the waveform of the modulated first voltage, and a variation trend of magnitude of the third pulsating waveform is consistent with that of the waveform of the modulated first voltage.

As illustrated in FIG. 1A, the above-mentioned power adapter further includes a first charging interface 105. The first charging interface 105 is coupled to the output end of the second rectifier 104. The first charging interface includes a data wire and a power wire. The power wire is configured to charge the battery of the terminal. The data wire is configured to communicate with the terminal. When the first charging interface is coupled with a second charging interface of the terminal, the control unit communicates with the terminal to determine a charging mode, in which the charging mode includes the first charging mode and the second charging mode.

Moreover, when the power adapter enters the first charging mode, the power adapter applies the third voltage with the third pulsating waveform to the battery of the terminal via the second charging interface, in which the second charging interface is coupled with the battery.

As illustrated in FIG. 1A, the sampling unit 106 may include a first current sampling circuit 1061 and a first voltage sampling circuit 1062. The sampling unit 106 is configured to sample voltage and/or current outputted by the second rectifier 104 to obtain the voltage sampling value and/or current sampling value. The control unit 107 is coupled to the sampling unit 106 and the switch unit 102 respectively. The control unit 107 is configured to output the control signal to the switch unit 102, and to adjust a duty ratio of the control signal according to the current sampling value and/or the voltage sampling value, such that the third voltage with the third pulsating waveform outputted by the second rectifier 104 meets a charging requirement of the terminal 2.

As illustrated in FIG. 1A, the terminal 2 includes a second charging interface 201 and a battery 202. The second charging interface 201 is coupled to the battery 202. When the second charging interface 201 is coupled to the first charging interface 105, the second charging interface 201 is configured to apply the third voltage with the third pulsating waveform to the battery 202, so as to charge the battery 202.

Figure 3:
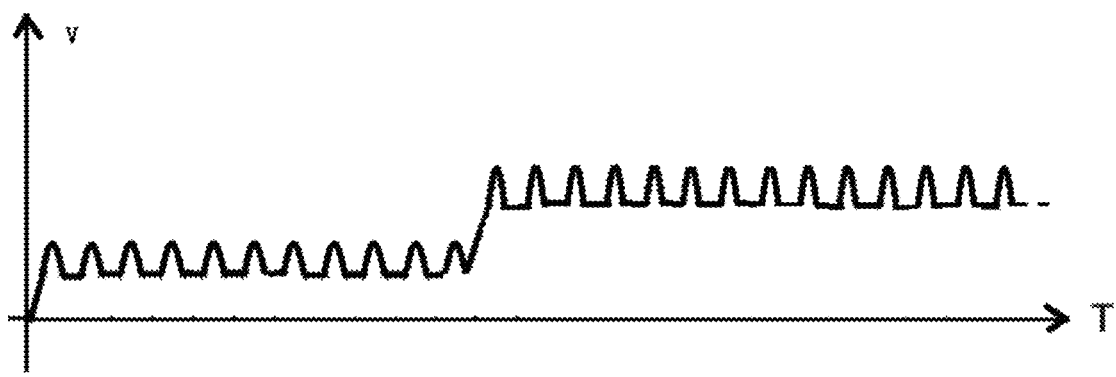
FIG. 3 is a schematic diagram illustrating a waveform of a charging voltage outputted to a battery from a power adapter according to an embodiment of the present disclosure.
Figure 4A:
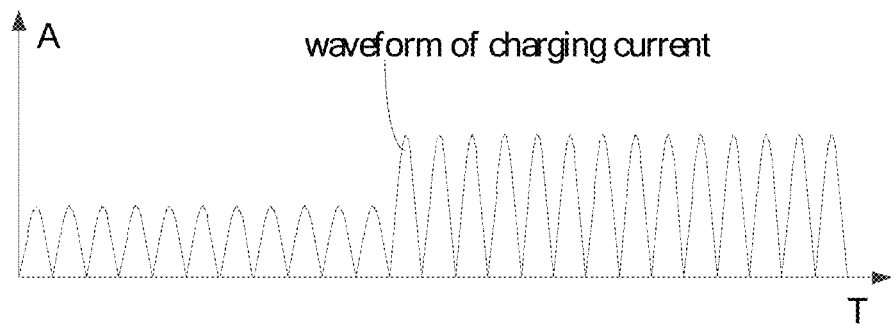
FIG. 4A is a schematic diagram illustrating a waveform of a charging current outputted to a battery from a power adapter according to an embodiment of the present disclosure.

It should be noted that, the third voltage with the third pulsating waveform meeting the charging requirement means that, the third voltage and current with the third pulsating waveform need to meet the charging voltage and charging current when the battery is charged. In other words, the control unit 107 is configured to adjust the duty ratio of the control signal (such as a PWM signal) according to the sampled voltage and/or current outputted by the power adapter, so as to adjust the output of the second rectifier 104 in real time and realize a closed-loop adjusting control, such that the third voltage with the third pulsating waveform meets the charging requirement of the terminal 2, thus ensuring the stable and safe charging of the battery 202. In detail, a waveform of a charging voltage outputted to the battery 202 is illustrated in FIG. 3, in which the waveform of the charging voltage is adjusted according to the duty ratio of the PWM signal. A waveform of a charging current outputted to the battery 202 is illustrated in FIG. 4A, in which the waveform of the charging current is adjusted according to the duty ratio of the PWM signal.

It can be understood that, when adjusting the duty ratio of the PWM signal, an adjusting instruction may be generated according to the voltage sampling value, or according to the current sampling value, or according to the voltage sampling value and the current sampling value.

Therefore, in embodiments of the present disclosure, by controlling the switch unit 102, a PWM chopping modulation is directly performed on the first voltage with the first pulsating waveform i.e. the steamed bun waveform after a rectification, and then a modulated voltage is sent to the high-frequency transformer and is coupled from the primary side to the secondary side via the high-frequency transformer, and then is changed back to the voltage/current with the steamed bun waveform or the voltage/current with the trapezoidal waveform after a synchronous rectification. The voltage/current with the steamed bun waveform/trapezoidal waveform is directly transmitted to the battery so as to realize fast charging (which is described as the second charging in the following) to the battery. The magnitude of the voltage with the steamed bun waveform/trapezoidal waveform may be adjusted according to the duty ratio of the PWM signal, such that the output of the power adapter may meet the charging requirement of the battery. It can be seen from that, the power adapter according to embodiments of the present disclosure, without providing electrolytic condensers at the primary side and the secondary side, may directly charge the battery via the voltage with the steamed bun waveform/trapezoidal waveform, such that a size of the power adapter may be reduced, thus realizing miniaturization of the power adapter, and decreasing cost greatly.

Figure 4B:
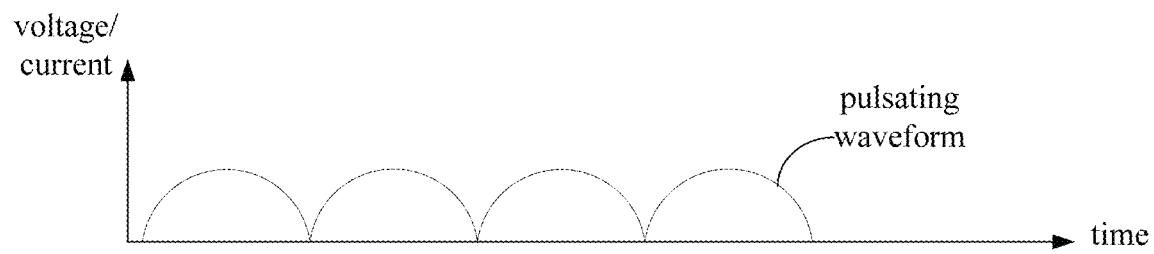
FIG. 4B and FIG. 4C are schematic diagrams illustrating pulsating waveforms according to an embodiment of the present disclosure.
Figure 4C:
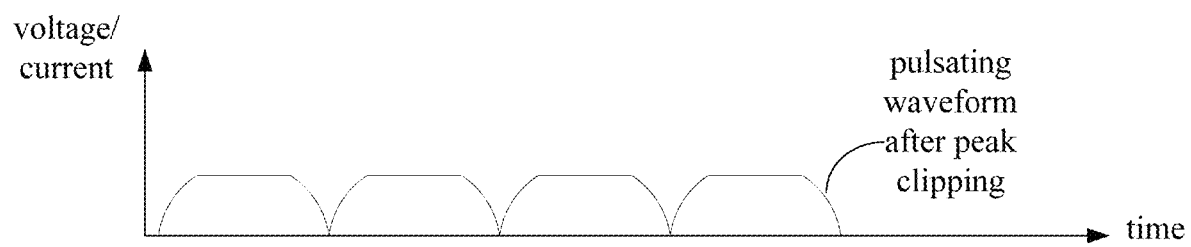

It could be understood that, the pulsating waveform transmitted to the battery for fast charging of the battery may be a full pulsating waveform, or may be a pulsating waveform obtained after performing peak clipping on the full pulsating waveform, in which the peak clipping may refer to filtering out a part of the pulsating waveform exceeding a certain threshold, thus realizing controlling the peaking value of the pulsating waveform. In the embodiment as illustrated in FIG. 4B, the pulsating waveform is a full pulsating waveform, and in the embodiment as illustrated in FIG. 4C, the pulsating waveform is a pulsating waveform after peak clipping.

In embodiments of the present disclosure, ways of limiting the peak value of the third pulsating waveforms is not limited.

Alternatively, in some embodiments, the third pulsating waveform may be a full pulsating waveform. For example, by modulation of the switch unit, the peak value of the current of the third pulsating waveform may be controlled to the current value corresponding to the current limiting point, while ensuring completeness of the third pulsating waveform.

Alternatively, in some other embodiments, the third pulsating waveform may be a waveform obtained after peak clipping.

Figure 4D:
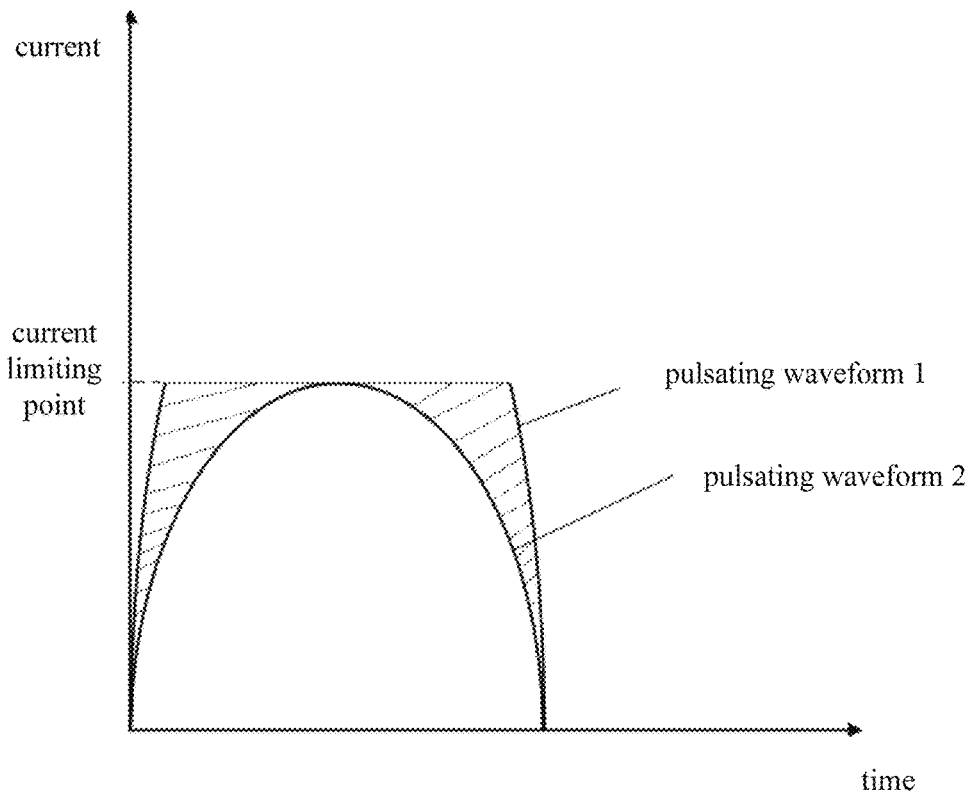
FIG. 4D is a schematic diagram illustrating different pulsating waveforms according to an embodiment of the present disclosure.

As illustrated in FIG. 4D, the pulsating waveform 2 is a full pulsating waveform, and the pulsating waveform 1 is a pulsating waveform obtained after peak clipping. Charging the device to be charged (such as the terminal) with the current having any of these two pulsating waveforms can reduce lithium precipitation and improve safety of the battery. However, an area enclosed by the pulsating waveform 1 and the time axis is greater than an area enclosed by the pulsating waveform 2 and the time axis (the area enclosed by the pulsating waveform 1 and the time axis is equal to a sum of the area enclosed by the pulsating waveform 2 and the axis and an area of the shaded portion), and the charging efficiency (or speed) of the power adapter according to embodiments of the present disclosure is in direct proportion to the area enclosed by the pulsating waveform and the axis, i.e., the greater the area enclosed by the pulsating waveform and the time axis is, the higher the charging efficiency is, and thus the efficiency of charging the device to be charged (such as the terminal) with the current of the pulsating waveform 1 is greater than that of charging the device to be charged (such as the terminal) with the current of the pulsating waveform 2.

Therefore, in embodiments of the present disclosure, performing peak clipping on the pulsating waveform not only can ensure that the peak value of the output current of the power adapter is equal to the current value corresponding to the current limiting point, but also can improve the charging efficiency.

Figure 4E:
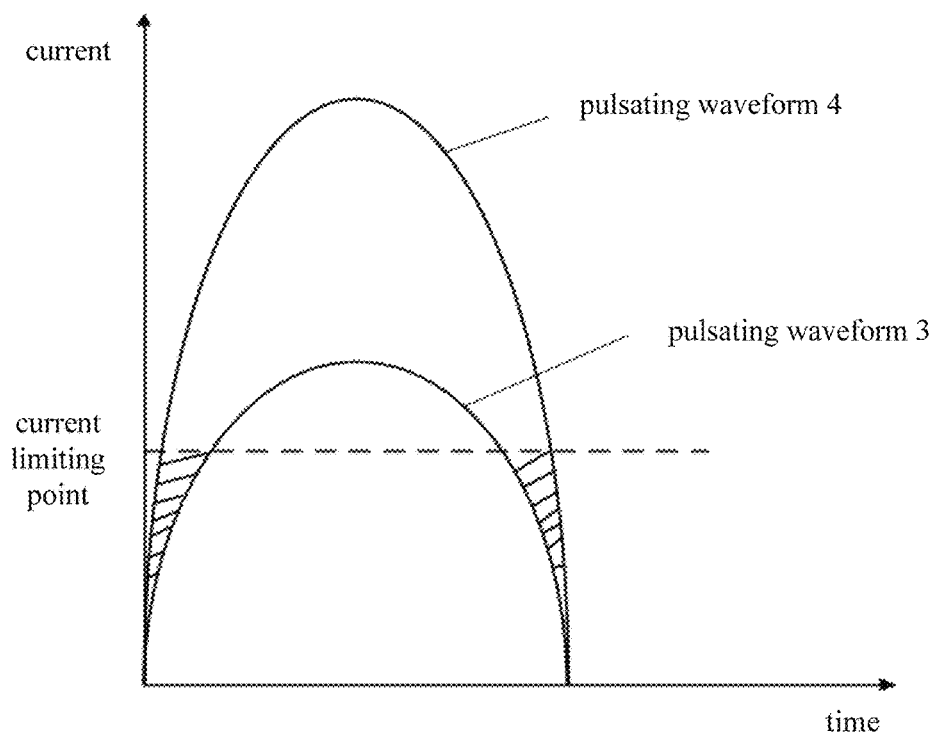
FIG. 4E is a schematic diagram illustrating different pulsating waveforms according to another embodiment of the present disclosure.
Figure 4F:
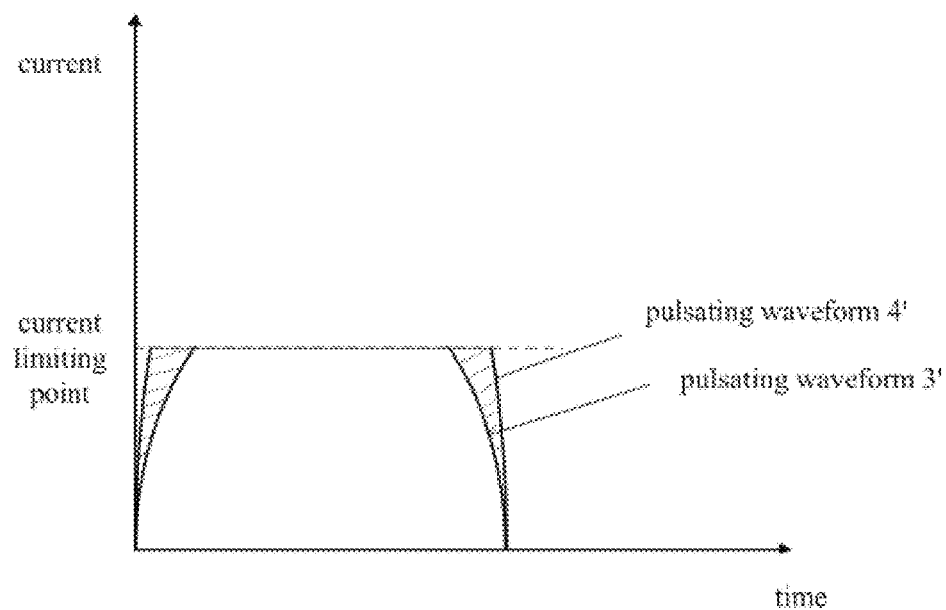
FIG. 4F is a schematic diagram illustrating different pulsating waveforms according to yet another embodiment of the present disclosure.

Further, taking FIG. 4E and FIG. 4F as an example, the pulsating waveform 3 and the pulsating waveform 4 in FIG. 4E are pulsating waveforms before peak clipping, the peak value of the pulsating waveform 3 is less than the peak value of the pulsating waveform 4, and the pulsating waveform 3' and the pulsating waveform 4' in FIG. 4F are the pulsating waveforms obtained after performing peak clipping on the pulsating waveform 3 and the pulsating waveform 4 in FIG. 4E respectively. In FIG. 4F, the area enclosed by the pulsating waveform 4' and the time axis is equal to a sum of the area enclosed by the pulsating waveform 3' and the time axis and the area of the shaded portion, the area enclosed by the pulsating waveform 4' is greater than the area enclosed by the pulsating waveform 3' and the time axis, and thus the efficiency of charging the device to be charged (such as the terminal) with the current of the pulsating waveform 4' is higher.

In other words, the higher the peak value of the pulsating waveform before peak clipping is, the higher the efficiency of charging with the current of the pulsating waveform after peak clipping is. Therefore, it is possible to improve the charging efficiency by increasing the peak value of the pulsating waveform before the peak clipping.

There are many ways for increasing the peak value of the pulsating waveform. For example, the peak value of the pulsating waveform may be increased by selecting a PWM controller having a higher maximum duty ratio, or by increasing an inductance value of the transformer.

In an embodiment of the present disclosure, the control unit 107 may be an MCU (micro controller unit), which means that the control unit 107 may be a microprocessor integrated with a switch driving control function, a synchronous rectification function, a voltage and current adjusting control function.

According to an embodiment of the present disclosure, the control unit 107 is further configured to adjust a frequency of the control signal according to the voltage sampling value and/or the current sampling value. That is, the control unit 107 is further configured to control to output the PWM signal to the switch unit 102 for a continuous time period, and then to stop outputting for a predetermined time period and then to restart to output the PWM signal. In this way, the voltage applied to the battery is intermittent, thus realizing the intermittent charging of the battery, which avoids a safety hazard caused by heating phenomenon occurring when the battery is charged continuously and improves the reliability and safety of the charging to the battery.

Under a low temperature condition, since the conductivity of ions and electrons in a lithium battery decreases, it is prone to intensify degree of polarization during a charging process for the lithium battery. A continuous charging not only makes this polarization serious but also increases a possibility of lithium precipitation, thus affecting safety performance of the battery. Furthermore, the continuous charging may accumulate heat generated due to the charging, thus leading to an increasing of internal temperature of the battery. When the temperature exceeds a certain value, performance of the battery may be limited, and possibility of safety hazard is increased.

In embodiments of the present disclosure, by adjusting the frequency of the control signal, the power adapter outputs intermittently, which means that a battery resting process is introduced into the charging process, such that the lithium precipitation due to the polarization during the continuous charging is reduced and continuous accumulation of generated heat may be avoided to realize drop in the temperature, thus ensuring the safety and reliability of charging to the battery.

Figure 5:
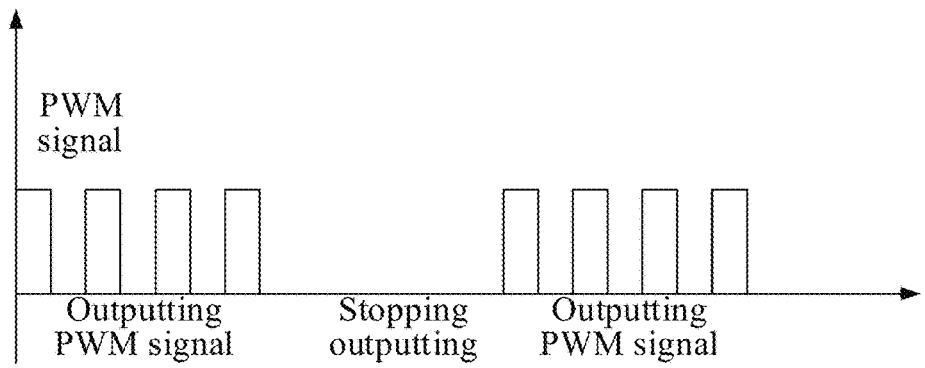
FIG. 5 is a schematic diagram illustrating a control signal outputted to a switch unit according to an embodiment of the present disclosure.

The control signal outputted to the switch unit 102 is illustrated in FIG. 5, for example. Firstly, the PWM signal is outputted for a continuous time period, then output of the PWM signal is stopped for a certain time period, and then the PWM signal is outputted for a continuous time period again. In this way, the control signal output to the switch unit 102 is intermittent, and the frequency is adjustable.

As illustrated in FIG. 1A, the control unit 107 is coupled to the first charging interface 105. The control unit 107 is further configured to obtain status information of the terminal 2 by performing a communication with the terminal 2 via the first charging interface 105. In this way, the control unit 107 is further configured to adjust the duty ratio of the control signal (such as the PWM signal) according to the status information of the terminal, the voltage sampling value and/or the current sampling value.

The status information of the terminal includes an electric quantity of the battery, a temperature of the battery, a voltage of the battery, interface information of the terminal and information on a path impedance of the terminal.

In detail, the first charging interface 105 includes a power wire and a data wire. The power wire is configured to charge the battery. The data wire is configured to communicate with the terminal. When the second charging interface 201 is coupled to the first charging interface 105, communication query instructions may be transmitted by the power adapter 1 and the terminal 2 to each other. A communication connection can be established between the power adapter 1 and the terminal 2 after receiving a corresponding reply instruction. The control unit 107 may obtain the status information of the terminal 2, so as to negotiated with the terminal 2 about a charging mode and charging parameters (such as the charging current, the charging voltage) and to control the charging process.

The charging mode supported by the power adapter and/or the terminal may include a first charging mode and a second charging mode. A charging speed of the first charging mode is faster than that of the second charging mode. For example, a charging current of the first charging mode is greater than that of the second charging mode. In general, the second charging mode may be understood as a charging mode in which a rated output voltage is 5V and a rated output current is less than or equal to 2.5 A. In addition, in the second charging mode, D+ and D− in the data wire of an output port of the power adapter may be short-circuited. On the contrary, in the first charging mode according to embodiments of the present disclosure, the power adapter may realize data exchange by communicating with the terminal via D+ and D− in the data wire, i.e., fast charging instructions may be sent by the power adapter and the terminal to each other. The power adapter sends a fast charging query instruction to the terminal. After receiving a fast charging reply instruction from the terminal, the power adapter obtains the status information of the terminal and starts the first charging mode according to the fast charging reply instruction. The charging current in the first charging mode may be greater than 2.5 A, for example, may be 4.5 A or more. The second charging mode is not limited in embodiments of the present disclosure. As long as the power adapter supports two charging modes one of which has a charging speed (or current) greater than the other charging mode, the charging mode with a slower charging speed may be regarded as the second charging mode. As to the charging power, the charging power in the first charging mode may be greater than or equal to 15 W.

The control unit 107 communicates with the terminal 2 via the first charging interface 105 to determine the charging mode. The charging mode includes the second charging mode and the first charging mode.

In detail, the power adapter is coupled to the terminal via a universal serial bus (USB) interface. The USB interface may be a general USB interface, or a micro USB interface, or any other kind of USB interface. A data wire in the USB interface is configured as the data wire in the first charging interface, and configured for a bidirectional communication between the power adapter and the terminal. The data wire may be D+ and/or D− wire in the USB interface. The bidirectional communication may refer to an information interaction performed between the power adapter and the terminal.

The power adapter performs the bidirectional communication with the terminal via the data wire in the USB interface, so as to determine to charge the terminal in the first charging mode.

It should be noted that, during a process that the power adapter and the terminal negotiate whether to charge the terminal in the first charging mode, the power adapter may only keep a coupling with the terminal but does not charge the terminal, or charges the terminal in the second charging mode or charges the terminal with small current, which is not limited herein.

The power adapter adjusts a charging current to a charging current corresponding to the first charging mode, and charges the terminal. After determining to charge the terminal in the first charging mode, the power adapter may directly adjust the charging current to the charging current corresponding to the first charging mode or may negotiate with the terminal about the charging current of the first charging mode. For example, the charging current corresponding to the first charging mode may be determined according to a current electric quantity of the battery of the terminal.

In embodiments of the present disclosure, the power adapter does not increase the output current blindly for fast charging, but needs to perform the bidirectional communication with the terminal so as to negotiate whether to adopt the first charging mode. In contrast to the related art, the safety of fast charging is improved.

Alternatively, as an embodiment, when the control unit 107 performs the bidirectional communication with the terminal via the first charging interface so as to determine to charge the terminal in the first charging mode, the control unit 107 is configured to send a first instruction to the terminal and to receive a first reply instruction from the terminal. The first instruction is configured to query the terminal whether to operate in the first charging mode. The first reply instruction is configured to indicate that the terminal agrees to operate in the first charging mode.

Alternatively, as an embodiment, before the control unit sends the first instruction to the terminal, the power adapter is configured to charge the terminal in the second charging mode. The control unit is configured to send the first instruction to the terminal when determining that a charging duration of the second charging mode is greater than a predetermined threshold.

It should be understood that, when the power adapter determines that the charging duration of the second charging mode is greater than the predetermined threshold, the power adapter may determine that the terminal has identified it as a power adapter, such that the second charging query communication may start.

Alternatively, as an embodiment, after determining the terminal is charged for a predetermined time period with a charging current greater than or equal to a predetermined current threshold, the power adapter is configured to send the first instruction to the terminal.

Alternatively, as an embodiment, the control unit is further configured to control the power adapter to adjust a charging current to a charging current corresponding to the first charging mode by controlling the switch unit. Before the power adapter charges the terminal with the charging current corresponding to the first charging mode, the control unit is configured to perform the bidirectional communication with the terminal via the data wire of the first charging interface to determine a charging voltage corresponding to the first charging mode, and to control the power adapter to adjust a charging voltage to the charging voltage corresponding to the first charging mode.

Alternatively, as an embodiment, when the control unit performs the bidirectional communication with the terminal via the data wire of the first charging interface to determine the charging voltage corresponding to the first charging mode, the control unit is configured to send a second instruction to the terminal, to receive a second reply instruction sent from the terminal, and to determine the charging voltage corresponding to the first charging mode according to the second reply instruction. The second instruction is configured to query whether a current output voltage of the power adapter is suitable for being used as the charging voltage corresponding to the first charging mode. The second reply instruction is configured to indicate that the current output voltage of the power adapter is suitable, high or low.

Alternatively, as an embodiment, before controlling the power adapter to adjust the charging current to the charging current corresponding to the first charging mode, the control unit is further configured to perform the bidirectional communication with the terminal via the data wire of the first charging interface to determine the charging current corresponding to the first charging mode.

Alternatively, as an embodiment, when performing the bidirectional communication with the terminal via the data wire of the first charging interface to determine the charging current corresponding to the first charging mode, the control unit is configured to send a third instruction to the terminal, to receive a third reply instruction sent from the terminal and to determine the charging current corresponding to the first charging mode according to the third reply instruction. The third terminal is configured to query a maximum charging current supported by the terminal. The third reply instruction is configured to indicate the maximum charging current supported by the terminal.

The power adapter may determine the above maximum charging current as the charging current corresponding to the first charging mode, or may set the charging current as a charging current less than the maximum charging current.

Alternatively, as an embodiment, during a process that the power adapter charges the terminal in the first charging mode, the control unit is further configured to perform the bidirectional communication with the terminal via the data wire of the first charging interface, so as to continuously adjust a charging current outputted to the battery from the power adapter by controlling the switch unit.

The power adapter may query the status information of the terminal continuously, for example, query the voltage of the battery of the terminal, the electric quantity of the battery, etc.

Alternatively, as an embodiment, when the control unit performs the bidirectional communication with the terminal via the data wire of the first charging interface to continuously adjust the charging current outputted to the battery from the power adapter by controlling the switch unit, the control unit is configured to send a fourth instruction to the terminal, to receive a fourth reply instruction sent by the terminal, and to adjust the charging current outputted by the power adapter to the terminal by controlling the switch unit according to the current voltage of the battery. The fourth instruction is configured to query a current voltage of the battery in the terminal. The fourth reply instruction is configured to indicate the current voltage of the battery in the terminal.

Alternatively, as an embodiment, the control unit is configured to adjust the charging current outputted to the battery from the power adapter to a charging current value corresponding to the current voltage of the battery by controlling the switch unit according to the current voltage of the battery and a predetermined correspondence between battery voltage values and charging current values.

In detail, the power adapter may store the correspondence between battery voltage values and charging current values in advance. The power adapter may also perform the bidirectional communication with the terminal via the data wire of the first charging interface to obtain from the terminal the correspondence between battery voltage values and charging current values stored in the terminal.

Alternatively, as an embodiment, during the process that the power adapter charges the terminal in the first charging mode, the control unit is further configured to determine whether there is a poor contact between the first charging interface and the second charging interface by performing the bidirectional communication with the terminal via the data wire of the first charging interface. When determining that there is the poor contact between the first charging interface and the second charging interface, the control unit is configured to control the power adapter to quit the first charging mode.

Alternatively, as an embodiment, before determining whether there is the poor contact between the first charging interface and the second charging interface, the control unit is further configured to receive information indicating a path impedance of the terminal from the terminal. The control unit is configured to send a fourth instruction to the terminal. The fourth instruction is configured to query a current voltage of the battery in the terminal. The control unit is configured to receive a fourth reply instruction sent by the terminal. The fourth reply instruction is configured to indicate the current voltage of the battery in the terminal. The control unit is configured to determine a path impedance from the power adapter to the battery according to an output voltage of the power adapter and the current voltage of the battery and determines whether there is the poor contact between the first charging interface and the second charging interface according to the path impedance from the power adapter to the battery, the path impedance of the terminal, and a path impedance of a charging wire between the power adapter and the terminal.

The terminal may record the path impedance thereof in advance. For example, since the terminals in a same type have a same structure, the path impedance of the terminals in the same type is set to a same value when configuring factory settings. Similarly, the power adapter may record the path impedance of the charging wire in advance. When the power adapter obtains the voltage cross two ends of the battery of the terminal, the path impedance of the whole path can be determined according to the voltage drop cross two ends of the battery and current of the path. When the path impedance of the whole path>the path impedance of the terminal+the path impedance of the charging wire, or the path impedance of the whole path−(the path impedance of the terminal+the path impedance of the charging wire)>an impedance threshold, it can be considered that there is the poor contact between the first charging interface and the second charging interface.

Alternatively, as an embodiment, before the power adapter quits the first charging mode, the control unit is further configured to send a fifth instruction to the terminal. The fifth instruction is configured to indicate that there is the poor contact between the first charging interface and the second charging interface.

After sending the fifth instruction, the power adapter may quit the first charging mode or reset.

The fast charging process according to embodiments of the present disclosure is described from the perspective of the power adapter, and then the fast charging process according to embodiments of the present disclosure will be described from the perspective of the terminal in the following.

It should be understood that, the interaction between the power adapter and the terminal, relative characteristics, functions described at the terminal side correspond to descriptions at the power adapter side, thus repetitive description will be omitted for simplification.

Figure 13:
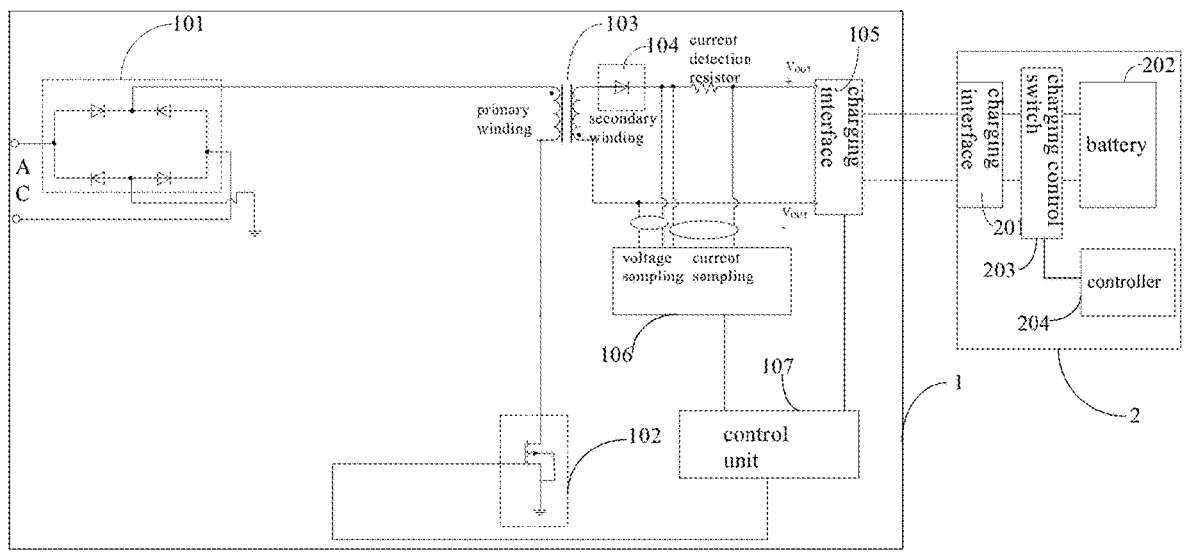
FIG. 13 is a schematic diagram illustrating a terminal according to an embodiment of the present disclosure.

According to an embodiment of the present disclosure, as illustrated in FIG. 13, the terminal 2 further includes a charging control switch 203 and a controller 204. The charging control switch 203, such as a switch circuit formed of an electronic switch element, is coupled between the second charging interface 201 and the battery 202, and is configured to switch on or off a charging process of the battery 202 under a control of the controller 204. In this way, the charging process of the battery 202 can be controlled at the terminal side, thus ensuring the safety and reliability of charging to battery 202.

Figure 14:
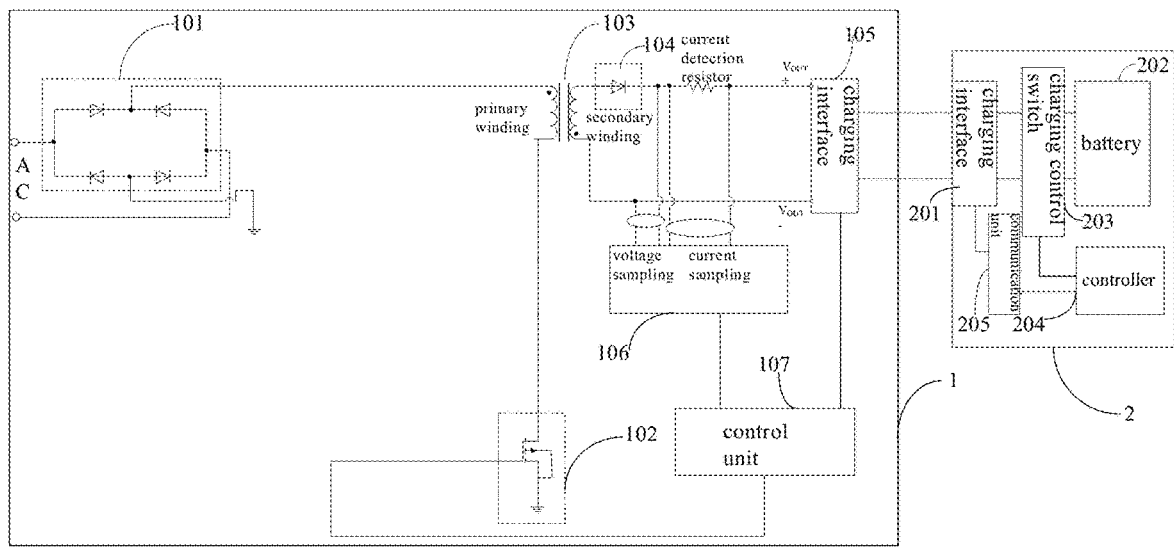
FIG. 14 is a schematic diagram illustrating a terminal according to another embodiment of the present disclosure.

As illustrated in FIG. 14, the terminal 2 further includes a communication unit 205. The communication unit 205 is configured to establish a bidirectional communication between the controller 204 and the control unit 107 via the second charging interface 201 and the first charging interface 105. In other words, the terminal 2 and the power adapter 1 can perform the bidirectional communication via the data wire in the USB interface. The terminal 2 supports the first charging mode and the second charging mode. The charging current of the first charging mode is greater than that of the second charging mode. The communication unit 205 and the control unit 107 perform bidirectional communication, such that the power adapter 1 determines to charge the terminal 2 in the first charging mode, and the control unit 107 controls the power adapter 1 to output according to the charging current corresponding to the first charging mode, for charging the battery 202 in the terminal 2.

In embodiments of the present disclosure, the power adapter 1 does not increase the output current blindly for the fast charging, but needs to perform the bidirectional communication with the terminal 2 to negotiate whether to adopt the first charging mode. In contrast to the related art, the safety of the second charging process is improved.

Alternatively, as an embodiment, the controller is configured to receive the first instruction sent by the control unit via the communication unit. The first instruction is configured to query the terminal whether to operate in the first charging mode. The controller is configured to send a first reply instruction to the control unit via the communication unit. The first reply instruction is configured to indicate that the terminal agrees to operate in the first charging mode.

Alternatively, as an embodiment, before the controller receives the first instruction sent by the control unit via the communication unit, the battery in the terminal is charged by the power adapter in the second charging mode. When the control unit determines that a charging duration of the second charging mode is greater than a predetermined threshold, the control unit sends the first instruction to the communication unit in the terminal, and the controller receives the first instruction sent by the control unit via the communication unit.

Alternatively, as an embodiment, before the power adapter outputs according to the charging current corresponding to the first charging mode for charging the battery in the terminal, the controller is configured to perform the bidirectional communication with the control unit via the communication unit, such that the power adapter determines the charging voltage corresponding to the first charging mode.

Alternatively, as an embodiment, the controller is configured to receive a second instruction sent by the control unit, and to send a second reply instruction to the control unit. The second instruction is configured to query whether a current output voltage of the power adapter is suitable for being used as the charging voltage corresponding to the first charging mode. The second reply instruction is configured to indicate that the current output voltage of the power adapter is suitable, high or low.

Alternatively, as an embodiment, the controller is configured to perform the bidirectional communication with the control unit, such that the power adapter determines the charging current corresponding to the first charging mode.

The controller is configured to receive a third instruction sent by the control unit, in which the third instruction is configured to query a maximum charging current supported by the terminal. The controller is configured to send a third reply instruction to the control unit, in which the third reply instruction is configured to indicate the maximum charging current supported by the terminal, such that the power adapter determines the charging current corresponding to the first charging mode according to the maximum charging current.

Alternatively, as an embodiment, during a process that the power adapter charges the terminal in the first charging mode, the controller is configured to perform the bidirectional communication with the control unit, such that the power adapter continuously adjusts a charging current outputted to the battery.

The controller is configured to receive a fourth instruction sent by the control unit, in which the fourth instruction is configured to query a current voltage of the battery in the terminal. The controller is configured to send a fourth reply instruction to the control unit, in which the fourth reply instruction is configured to indicate the current voltage of the battery in the terminal, such that the power adapter continuously adjusts the charging current outputted to the battery according to the current voltage of the battery.

Alternatively, as an embodiment, during the process that the power adapter charges the terminal in the first charging mode, the controller is configured to perform the bidirectional communication with the control unit via the communication unit, such that the power adapter determines whether there is a poor contact between the first charging interface and the second charging interface.

The controller receives a fourth instruction sent by the control unit. The fourth instruction is configured to query a current voltage of the battery in the terminal. The controller sends a fourth reply instruction to the control unit, in which the fourth reply instruction is configured to indicate the current voltage of the battery in the terminal, such that the control unit determines whether there is the poor contact between the first charging interface and the second charging interface according to an output voltage of the power adapter and the current voltage of the battery.

Alternatively, as an embodiment, the controller is configured to receive a fifth instruction sent by the control unit. The fifth instruction is configured to indicate that there is the poor contact between the first charging interface and the second charging interface.

Figure 6:
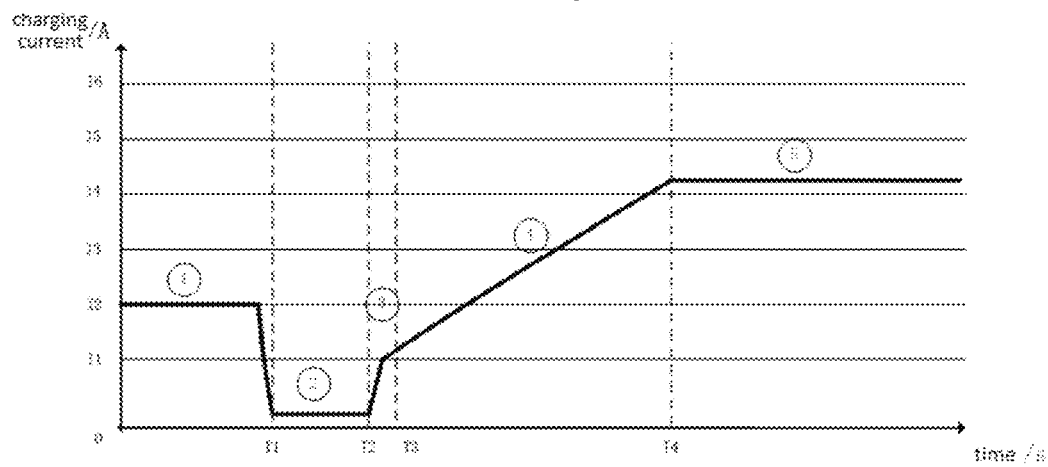
FIG. 6 is a schematic diagram illustrating a fast charging process according to an embodiment of the present disclosure.

In order to initiate and adopt the first charging mode, the power adapter may perform a fast charging communication procedure with the terminal, for example, by one or more handshakes, so as to realize the second charging of battery. Referring to FIG. 6, the fast charging communication procedure according to embodiments of the present disclosure and respective stages in the fast charging process will be described in detail. It should be understood that, communication actions or operations illustrated in FIG. 6 are merely exemplary. Other operations or various modifications of respective operations in FIG. 6 can be implemented in embodiments of the present disclosure. In addition, respective stages in FIG. 6 may be executed in an order different from that illustrated in FIG. 6, and it is unnecessary to execute all the operations illustrated in FIG. 6. It should be noted that, a curve in FIG. 6 represents a variation trend of a peak value or a mean value of the charging current, rather than a curve of actual charging current.

As illustrated in FIG. 6, the fast charging process may include the following five stages.

Stage 1:

After being coupled to a power supply providing device, the terminal may detect a type of the power supply providing device via the data wire D+ and D−. When detecting that the power supply providing device is a power adapter, the terminal may absorb current greater than a predetermined current threshold I2, such as 1 A. When the power adapter detects that current outputted by the power adapter is greater than or equal to I2 within a predetermined time period (such as a continuous time period T1), the power adapter determines that the terminal has completed the recognition of the type of the power supply providing device. The power adapter initiates a handshake communication between the power adapter and the terminal, and sends an instruction 1 (corresponding to the above-mentioned first instruction) to query the terminal whether to operate in the first charging mode (or flash charging).

When receiving a reply instruction indicating that the terminal disagrees to operate in the first charging mode from the terminal, the power adapter detects the output current of the power adapter again. When the output current of the power adapter is still greater than or equal to I2 within a predetermined continuous time period (such as a continuous time period T1), the power adapter initiates a request again to query the terminal whether to operate in the first charging model. The above actions in stage 1 are repeated, until the terminal replies that it agrees to operate in the first charging mode or the output current of the power adapter is no longer greater than or equal to I2.

After the terminal agrees to operate in the first charging mode, the fast charging process is initiated, and the fast charging communication procedure goes into stage 2.

Stage 2:

For the voltage with the steamed bun waveform/trapezoidal waveform outputted by the power adapter, there may be several levels. The power adapter sends an instruction 2 (corresponding to the above-mentioned second instruction) to the terminal to query the terminal whether the output voltage of the power adapter matches to the current voltage of the battery (or whether the output voltage of the power adapter is suitable, i.e., suitable for the charging voltage in the first charging mode), i.e., whether the output voltage of the power adapter meets the charging requirement.

The terminal replies that the output voltage of the power adapter is higher, lower or suitable. When the power adapter receives a feedback indicating that the output voltage of the power adapter is lower or higher from the terminal, the control unit adjusts the output voltage of the power adapter by one level by adjusting the duty ratio of the PWM signal, and sends the instruction 2 to the terminal again to query the terminal whether the output voltage of the power adapter matches.

The above actions in stage 2 are repeated, until the terminal replies to the power adapter that the output voltage of the power adapter is at a matching level. And then the fast charging communication procedure goes into stage 3.

Stage 3:

After the power adapter receives the feedback indicating that the output voltage of the power adapter matches from the terminal, the power adapter sends an instruction 3

(corresponding to the above-mentioned third instruction) to the terminal to query the maximum charging current supported by the terminal. The terminal returns to the power adapter the maximum charging current supported by itself, and then the fast charging communication procedure goes into stage 4.

Stage 4:

After receiving a feedback indicating the maximum charging current supported by the terminal from the terminal, the power adapter may set an output current reference value. The control unit 107 adjusts the duty ratio of the PWM signal according to the output current reference value, such that the output current of the power adapter meets the charging current requirement of the terminal, and the second charging communication procedure goes into constant current stage. The constant current stage means that the peak value or mean value of the output current of the power adapter basically remains unchanged (which means that the variation amplitude of the peak value or mean value of the output current is very small, for example within a range of 5% of the peak value or mean value of the output current), namely, the peak value of the current with the third pulsating waveform keeps constant in each period.

Stage 5:

When the fast charging communication procedure goes into the constant current stage, the power adapter sends an instruction 4 (corresponding to the above-mentioned fourth instruction) at intervals to query the current voltage of battery in the terminal. The terminal may feedback to the power adapter the current voltage of the battery, and the power adapter may determine according to the feedback of the current voltage of the battery whether there is a poor USB contact (i.e., a poor contact between the first charging interface and the second charging interface) and whether it is necessary to decrease the charging current value of the terminal. When the power adapter determines that there is the poor USB contact, the power adapter sends an instruction 5 (corresponding to the above-mentioned fifth instruction), and then the power adapter is reset, such that the fast charging communication procedure goes into stage 1 again.

Alternatively, in some embodiments of the present disclosure, in stage 1, when the terminal replies to the instruction 1, data corresponding to the instruction 1 may carry data (or information) on the path impedance of the terminal. The data on the path impedance of the terminal may be used in stage 5 to determine whether there is the poor USB contact.

Alternatively, in some embodiments of the present disclosure, in stage 2, the time period from when the terminal agrees to operate in the first charging mode to when the power adapter adjusts the voltage to a suitable value may be limited in a certain range. If the time period exceeds a predetermined range, the terminal may determine that there is an exception request, thus a quick reset is performed.

Alternatively, in some embodiments of the present disclosure, in stage 2, the terminal may give a feedback indicating that the output voltage of the power adapter is suitable/matches to the power adapter when the output voltage of the power adapter is adjusted to a value higher than the current voltage of the battery by ΔV (ΔV is about 200-500 mV). When the terminal gives a feedback indicating that the output voltage of the power adapter is not suitable (higher or lower) to the power adapter, the control unit 107 adjusts the duty ratio of the PWM signal according to the voltage sampling value, so as to adjust the output voltage of the power adapter.

Alternatively, in some embodiments of the present disclosure, in stage 4, the adjusting speed of the output current value of the power adapter may be controlled to be in a certain range, thus avoiding an abnormal interruption of the second charging due to the too fast adjusting speed.

Alternatively, in some embodiments of the present disclosure, in stage 5, the variation amplitude of the output current value of the power adapter may be controlled to be within 5%, i.e., stage 5 may be regarded as the constant current stage.

Alternatively, in some embodiments of the present disclosure, in stage 5, the power adapter monitors the impedance of a charging loop in real time, i.e., the power adapter monitors the impedance of the whole charging loop by measuring the output voltage of the power adapter, the charging current and the read-out voltage of the battery in the terminal. When the impedance of the charging loop>the path impedance of the terminal+the impedance of the second charging data wire, it may be considered that there is the poor USB contact, and thus a second charging reset is performed.

Alternatively, in some embodiments of the present disclosure, after the first charging mode is started, a time interval of communications between the power adapter and the terminal may be controlled to be in a certain range, such that the fast charging reset can be avoided.

Alternatively, in some embodiments of the present disclosure, the termination of the first charging mode (or the fast charging process) may be a recoverable termination or an unrecoverable termination.

For example, when the terminal detects that the battery is fully charged or there is the poor USB contact, the fast charging is stopped and reset, and the fast charging communication procedure goes into stage 1. When the terminal disagrees to operate in the first charging mode, the fast charging communication procedure would not go into stage 2, and in this case, the termination of the fast charging process may be considered as an unrecoverable termination.

For another example, when an exception occurs in the communication between the terminal and the power adapter, the fast charging is stopped and reset, and the fast charging communication procedure goes into stage 1. After requirements for stage 1 are met, the terminal agrees to operate in the first charging mode to recover the fast charging process, and in this case, the termination of the fast charging process may be considered as a recoverable termination.

For another example, when the terminal detects an exception occurring in the battery, the fast charging is stopped and reset, and the fast charging communication procedure goes into stage 1. After the fast charging communication procedure goes into stage 1, the terminal disagrees to operate in the first charging mode. Till the battery returns to normal and the requirements for stage 1 are met, the terminal agrees to start the fast charging to recover the fast charging process. Is this case, the termination of fast charging process may be considered as a recoverable termination.

It should be noted that, communication actions or operations illustrated in FIG. 6 are merely exemplary. For example, in stage 1, after the terminal is coupled to the power adapter, the handshake communication between the terminal and the power adapter may be initiated by the terminal. In other words, the terminal sends an instruction 1 to query the power adapter whether to operate in the first charging mode (or flash charging). When receiving a reply instruction indicating that the power adapter agrees to operate in the first charging mode from the power adapter, the terminal starts the fast charging process.

It should be noted that, communication actions or operations illustrated in FIG. 6 are merely exemplary. For example, after stage 5, there is a constant voltage charging stage. In other words, in stage 5, the terminal may feedback the current voltage of the battery in the terminal to the power adapter. As the voltage of the battery increases continuously, the charging goes into the constant voltage charging stage when the current voltage of the battery reaches a constant voltage charging voltage threshold. The control unit 107 adjusts the duty ratio of the PWM signal according to the voltage reference value (i.e., the constant voltage charging voltage threshold), such that the output voltage of the power adapter meets the charging voltage requirement of the terminal, i.e., the output voltage of the power adapter basically changes at a constant rate. During the constant voltage charging stage, the charging current decreases gradually. When the current reduces to a certain threshold, the charging is stopped and it is illustrated that the battery is fully charged. The constant voltage charging refers to that the peak voltage with the third pulsating waveform basically keeps constant.

It should be noted that, in embodiments of the present disclosure, acquiring output voltage of the power adapter means that the peak value or mean value of voltage with the third pulsating waveform is acquired. Acquiring output current of the power adapter means that the peak value or mean value of current with the third pulsating waveform is acquired.

Figure 7A:
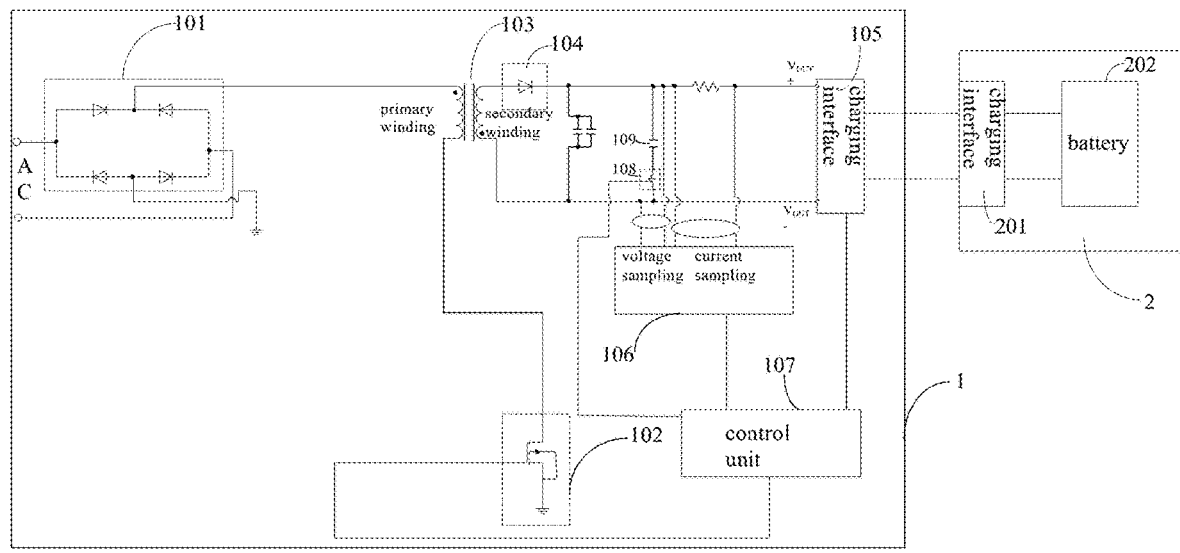
FIG. 7A is a schematic diagram illustrating a charging system according to an embodiment of the present disclosure.
Figure 7B:
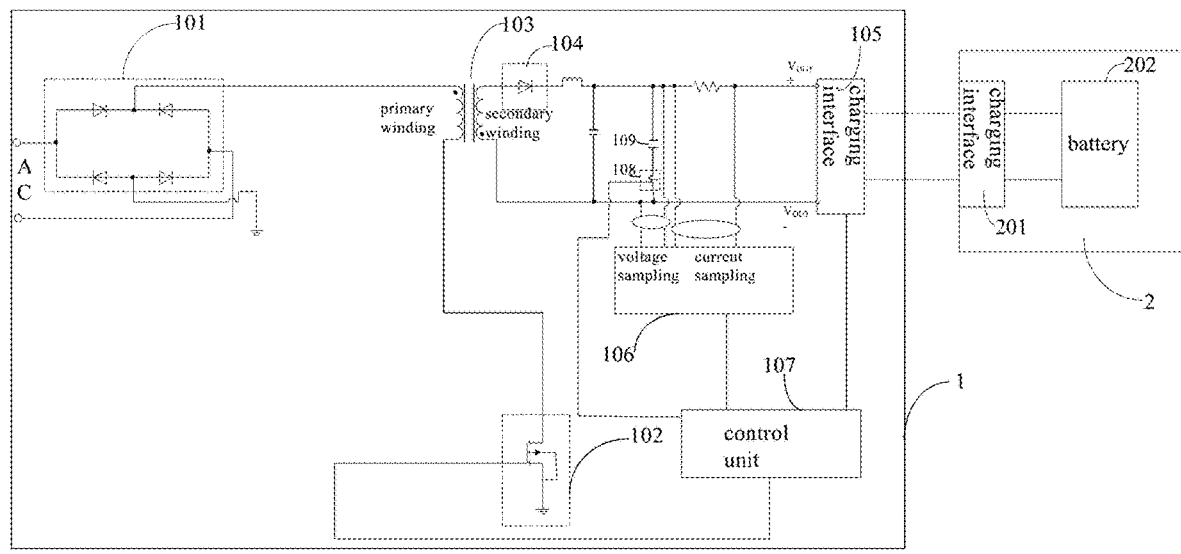
FIG. 7B is a schematic diagram illustrating a power adapter with a LC filter circuit according to an embodiment of the present disclosure.

In an embodiment of the present disclosure, as illustrated in FIG. 7, the power adapter 1 further includes a controllable switch 108 and a filtering unit 109 in series. The controllable switch 108 and the filtering unit 109 in series are coupled to the first output end of the second rectifier 104. The control unit 107 is further configured to control the controllable switch 108 to switch on when determining the charging mode as the second charging mode, and to control the controllable switch 108 to switch off when determining the charging mode as the first charging mode. The output end of the second rectifier 104 is further coupled to one or more groups of small capacitors in parallel, which can not only realize a noise reduction, but also reduce the occurrence of surge phenomenon. The output end of the second rectifier 104 is further coupled to an LC filtering circuit or π type filtering circuit, so as to filter out ripple interference. As illustrated in FIG. 7B, the output end of the second rectifier 104 is coupled to an LC filtering circuit. It should be noted that, all capacitors in the LC filtering circuit or the π type filtering circuit are small capacitors, which occupy small space.

The filtering unit 109 includes a filtering capacitor, which supports a standard charging of 5V corresponding to the second charging mode. The controllable switch 108 may be formed of a semiconductor switch element such as a MOS transistor. When the power adapter charges the battery in the terminal in the second charging mode (or called as standard charging), the control unit 107 controls the controllable switch 108 to switch on so as to incorporate the filtering unit 109 into the circuit, such that a filtering can be performed on the output of the second rectifier 104. In this way, the direct charging technology is compatible, i.e., the direct current is applied to the battery in the terminal so as to realize direct current charging of the battery. For example, in general, the filtering unit includes an electrolytic condenser and a common capacitor such as a small capacitor supporting standard charging of 5V (for example, a solid-state capacitor) in parallel. Since the electrolytic condenser occupies a bigger volume, in order to reduce the size of the power adapter, the electrolytic condenser may be removed from the power adapter and only one capacitor with low capacitance is left. When the second charging mode is adopted, a branch where the small capacitor is located is switched on, and the current is filtered so as to realize a stable output with low power for performing a direct current charging on the battery. When the first charging mode is adopted, a branch where the small capacitor is located is switched off, and the output of the second rectifier 104 directly apply the voltage/current with pulsating waveform without filtering to the battery, so as to realize a second charging of the battery.

According to an embodiment of the present disclosure, the control unit 107 is further configured to obtain the charging current and/or the charging voltage corresponding to the first charging mode according to the status information of the terminal and to adjust the duty ratio of the control signal such as the PWM signal according to the charging current and/or the charging voltage corresponding to the first charging mode, when determining the charging mode as the first charging mode. In other words, when determining the current charging mode as the first charging mode, the control unit 107 obtains the charging current and/or the charging voltage corresponding to the first charging mode according to the obtained status information of the terminal such as the voltage, the electric quantity and the temperature of the battery, running parameters of the terminal and power consumption information of applications running on the terminal, and adjusts the duty ratio of the control signal according to the charging current and/or the charging voltage, such that the output of the power adapter meets the charging requirement, thus realizing the second charging of the battery.

The status information of the terminal includes the temperature of the terminal. When the temperature of the battery is greater than a first predetermined temperature threshold, or the temperature of the battery is less than a second predetermined temperature threshold, if the current charging mode is the first charging mode, the first charging mode is switched to the second charging mode. The first predetermined temperature threshold is greater than the second predetermined temperature threshold. In other words, when the temperature of the battery is too low (for example, corresponding to less than the second predetermined temperature threshold) or too high (for example, corresponding to greater than the first predetermined temperature threshold), it is unsuitable to perform the second charging, such that it needs to switch from the first charging mode to the second charging mode. In embodiments of the present disclosure, the first predetermined temperature threshold and the second predetermined temperature threshold can be set according to actual situations, or can be written into the storage of the control unit (such as the MCU of the power adapter).

In an embodiment of the present disclosure, the control unit 107 is further configured to control the switch unit 102 to switch off when the temperature of the battery is greater than a predetermined high temperature protection threshold. Namely, when the temperature of the battery exceeds the high temperature protection threshold, the control unit 107 needs to apply a high temperature protection strategy to control the switch unit 102 to switch off, such that the power adapter stops charging the battery, thus realizing the high protection of the battery and improving the safety of charging. The high temperature protection threshold may be different from or the same to the first temperature threshold. In an embodiment, the high temperature protection threshold is greater than the first temperature threshold.

In another embodiment of the present disclosure, the controller is further configured to obtain the temperature of the battery, and to control the charging control switch to switch off (i.e., the charging control switch can be switched off at the terminal side) when the temperature of the battery is greater than the predetermined high temperature protection threshold, so as to stop the charging process of the battery and to ensure the safety of charging.

Moreover, in an embodiment of the present disclosure, the control unit is further configured to obtain a temperature of the first charging interface, and to control the switch unit to switch off when the temperature of the first charging interface is greater than a predetermined protection temperature. In other words, when the temperature of the charging interface exceeds a certain temperature, the control unit 107 needs to apply the high temperature protection strategy to control the switch unit 102 to switch off, such that the power adapter stops charging the battery, thus realizing the high protection of the battery and improving the safety of charging.

Certainly, in another embodiment of the present disclosure, the controller obtains the temperature of the first charging interface by performing the bidirectional communication with the control unit. When the temperature of the first charging interface is greater than the predetermined protection temperature, the controller controls the charging control switch (referring to FIG. 13 and FIG. 14) to switch off, i.e., switches off the charging control switch at the terminal side, so as to stop the charging process of the battery, thus ensuring the safety of charging.

Figure 8:
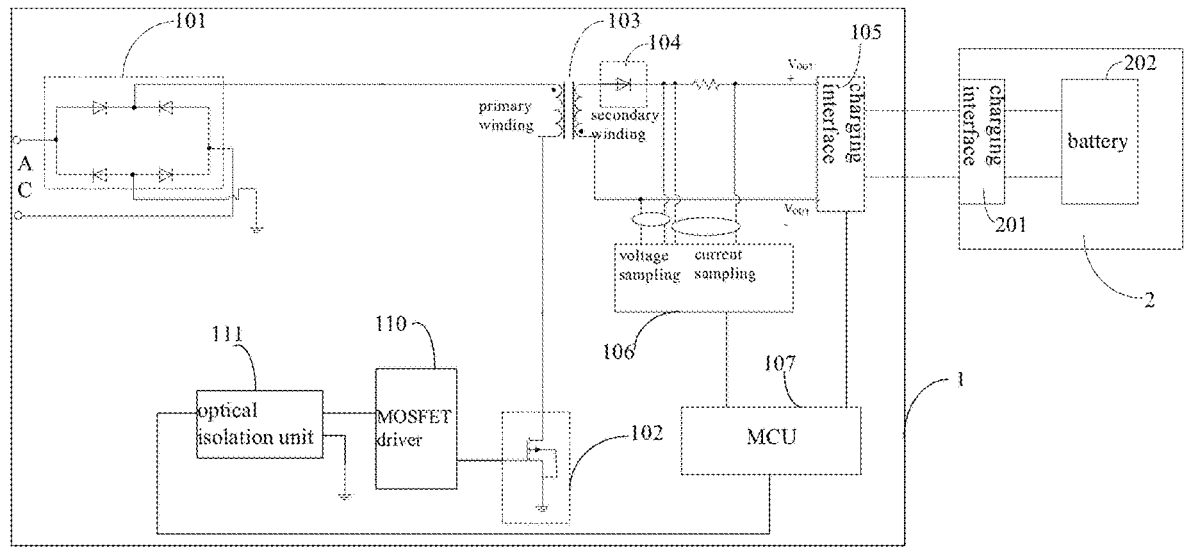
FIG. 8 is a schematic diagram illustrating a charging system for a terminal according to another embodiment of the present disclosure.

In detail, in an embodiment of the present disclosure, as illustrated in FIG. 8, the power adapter 1 further includes a driving unit 110 such as a MOSFET driver. The driving unit 110 is coupled between the switch unit 102 and the control unit 107. The driving unit 110 is configured to drive the switch unit 102 to switch on or off according to the control signal. Certainly, it should be noted, in other embodiments of the present disclosure, the driving unit 110 may also be integrated in the control unit 107.

Further, as illustrated in FIG. 8, the power adapter 1 further includes an isolation unit 111. The isolation unit 111 is coupled between the driving unit 110 and the control unit 107, to realize a signal isolation between the primary side and the secondary side of the power adapter 1 (or a signal isolation between the primary winding and the secondary winding of the transformer 103). The isolation unit 111 may be implemented in an optical isolation manner, or in other isolation manners. By setting the isolation unit 111, the control unit 107 may be disposed at the secondary side of the power adapter 1 (or the secondary winding side of the transformer 103), such that it is convenient to communicate with the terminal 2, and the space design of the power adapter 1 becomes easier and simpler.

Certainly, it should be understood that, in other embodiments of the present disclosure, both the control unit 107 and the driving unit 110 can be disposed at the primary side, in this way, the isolation unit 111 can be disposed between the control unit 107 and the sampling unit 106, so as to realize the signal isolation between the primary side and the secondary side of the power adapter 1.

Further, it should be noted that, in embodiments of the present disclosure, when the control unit 107 is disposed at the secondary side, the isolation unit 111 is required, and the isolation unit 111 may be integrated in the control unit 107. In other words, when the signal is transmitted from the primary side to the secondary side or from the secondary side to the primary side, an isolation unit is required to realize the signal isolation.

Figure 9:
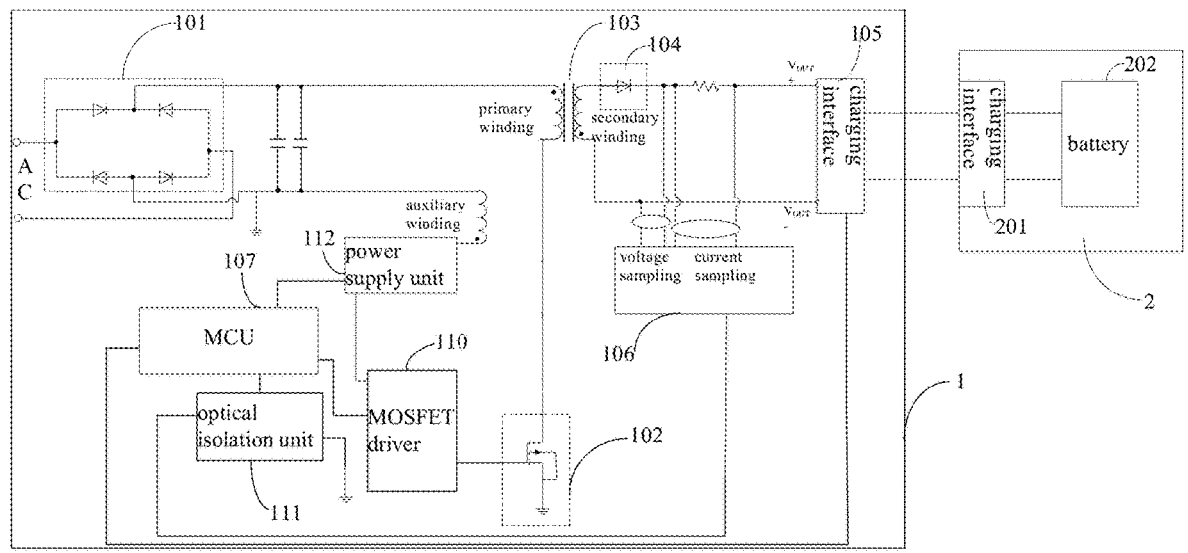
FIG. 9 is a schematic diagram illustrating a charging system for a terminal according to yet another embodiment of the present disclosure.

In an embodiment of the present disclosure, as illustrated in FIG. 9, the power adapter 1 further includes an auxiliary winding and a power supply unit 112. The auxiliary winding generates a fourth voltage with a fourth pulsating waveform according to the modulated first voltage. The power supply unit 112 is coupled to the auxiliary winding. The power supply unit 112 (for example, including a filtering voltage regulator module, a voltage converting module and the like) is configured to convert the fourth voltage with the fourth pulsating waveform and output a direct current, and to supply power to the driving unit 110 and/or the control unit 107 respectively. The power supply unit 112 may be formed of a small filtering capacitor, a voltage regulator chip or other elements, performs a process and conversation on the fourth voltage with the fourth pulsating waveform and outputs the low voltage direct current such as 3.3V, 5V or the like.

In other words, the power supply of the driving unit 110 can be obtained by performing a voltage conversation on the fourth voltage with the fourth pulsating waveform by the power supply unit 112. When the control unit 107 is disposed at the primary side, the power supply of the control unit 107 can also be obtained by performing a voltage conversation on the fourth voltage with the fourth pulsating waveform by the power supply unit 112. As illustrated in FIG. 9, when the control unit 107 is disposed at the primary side, the power supply unit 112 provides two lines of direct current outputs, so as to supply power to the driving unit 110 and the control unit 107 respectively. An optical isolation unit 111 is arranged between the control unit 107 and the sampling unit 106 to realize the signal isolation between the primary side and the secondary side of the power adapter 1.

When the control unit 107 is disposed at the primary side and integrated with the driving unit 110, the power supply unit 112 supplies power to the control unit 107 only. When the control unit 107 is disposed at the secondary side and the driving unit 110 is disposed at the primary side, the power supply unit 112 supplies power to the driving unit 110 only. The power supply to the control unit 107 is realized by the secondary side, for example, a power supply unit converts the third voltage with the third pulsating waveform outputted by the second rectifier 104 to direct current to supply power to the control unit 107.

Moreover, in embodiments of the present disclosure, several small capacitors are coupled in parallel to the output end of first rectifier 101 for filtering. Or the output end of the first rectifier 110 is coupled to an LC filtering circuit.

Figure 10:
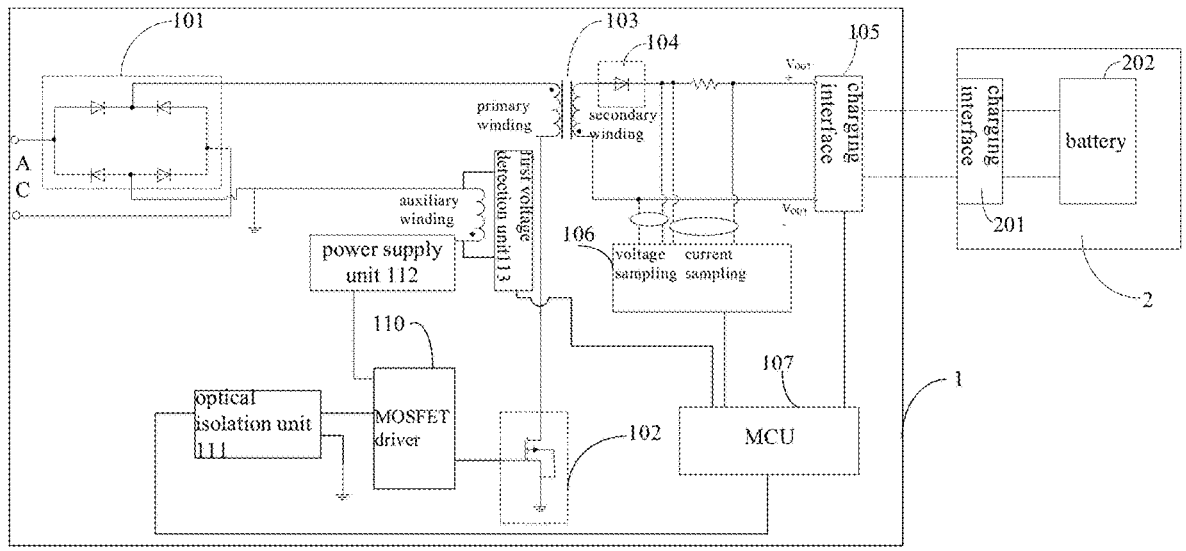
FIG. 10 is a schematic diagram illustrating a charging system for a terminal according to still another embodiment of the present disclosure.

In another embodiment of the present disclosure, as illustrated in FIG. 10, the power adapter 1 further includes a first voltage detecting unit 113. The first voltage detecting unit 113 is coupled to the auxiliary winding and the control unit 107 respectively. The first voltage detecting unit 113 is configured to detect the fourth voltage to generate a voltage detecting value. The control unit 107 is further configured to adjust the duty ratio of the control signal according to the voltage detecting value.

In other words, the control unit 107 may reflect the voltage outputted by the second rectifier 104 with the voltage outputted by the secondary winding and detected by the first voltage detecting unit 113, and then adjusts the duty ratio of the control signal according to the voltage detecting value, such that the output of the second rectifier 104 meets the charging requirement of the battery.

Figure 11:
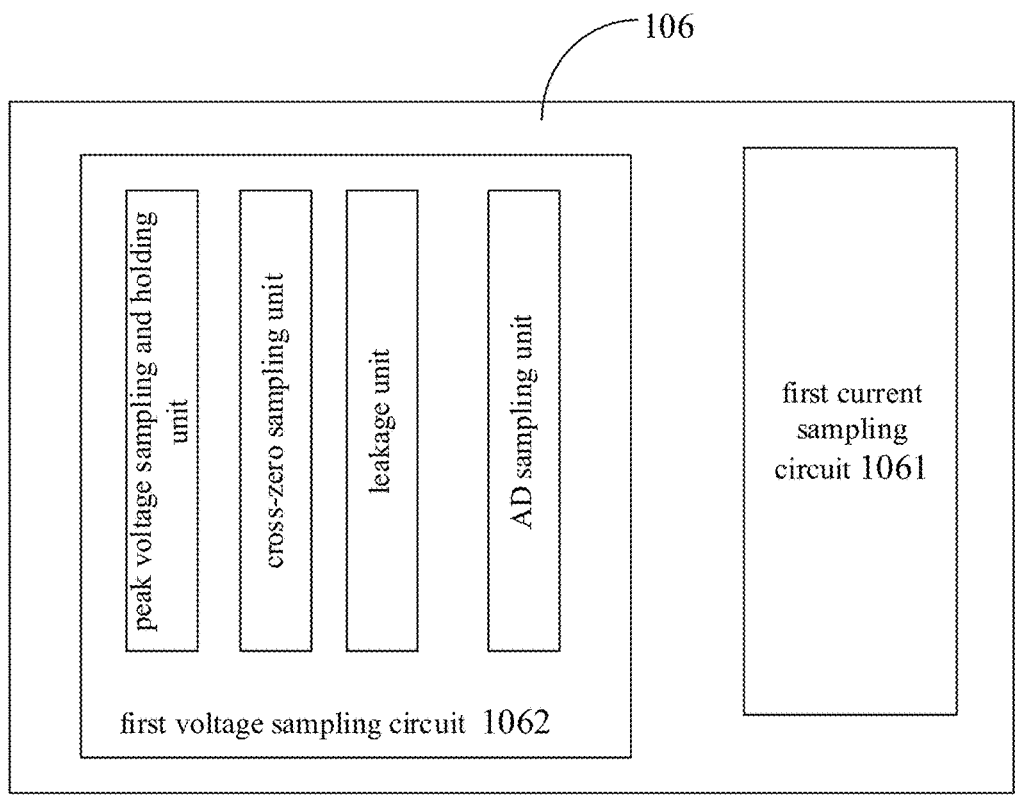
FIG. 11 is a block diagram of a sampling unit according to an embodiment of the present disclosure.

In detail, in an embodiment of the present disclosure, as illustrated in FIG. 11, the sampling unit 106 includes a first current sampling circuit 1061 and a first voltage sampling circuit 1062. The first current sampling circuit 1061 is configured to sample the current outputted by the second rectifier 104 so as to obtain the current sampling value. The first voltage sampling circuit 1062 is configured to sample the voltage outputted by the second rectifier 104 so as to obtain the voltage sampling value.

Alternatively, the first current sampling circuit 1061 can sample the current outputted by the second rectifier 104 by sampling voltage on a resistor (current detection resistor) coupled to the first output end of the second rectifier 104. The first voltage sampling circuit 1062 can sample the voltage outputted by the second rectifier 104 by sampling the voltage cross the first output end and the second output end of the second rectifier 104.

Moreover, in an embodiment of the present disclosure, as illustrated in FIG. 11, the first voltage sampling circuit 1062 includes a peak voltage sampling and holding unit, a cross-zero sampling unit, a leakage unit and an AD sampling unit. The peak voltage sampling and holding unit is configured to sample and hold a peak voltage of the third pulsating waveform. The cross-zero sampling unit is configured to sample a zero crossing point of the third pulsating waveform. The leakage unit is configured to perform a leakage on the peak voltage sampling and holding unit at the zero crossing point. The AD sampling unit is configured to sample the peak voltage in the peak voltage sampling and holding unit so as to obtain the voltage sampling value.

By providing with the peak voltage sampling and holding unit, the cross-zero sampling unit, the leakage unit and the AD sampling unit in the first voltage sampling circuit 1062, the voltage outputted by the second rectifier 104 may be sampled accurately, and it can be guaranteed that the voltage sampling value keeps synchronous with the first voltage, i.e., the phase and variation trend of magnitude of the voltage sampling value are consistent with those of the first voltage respectively.

Figure 12:
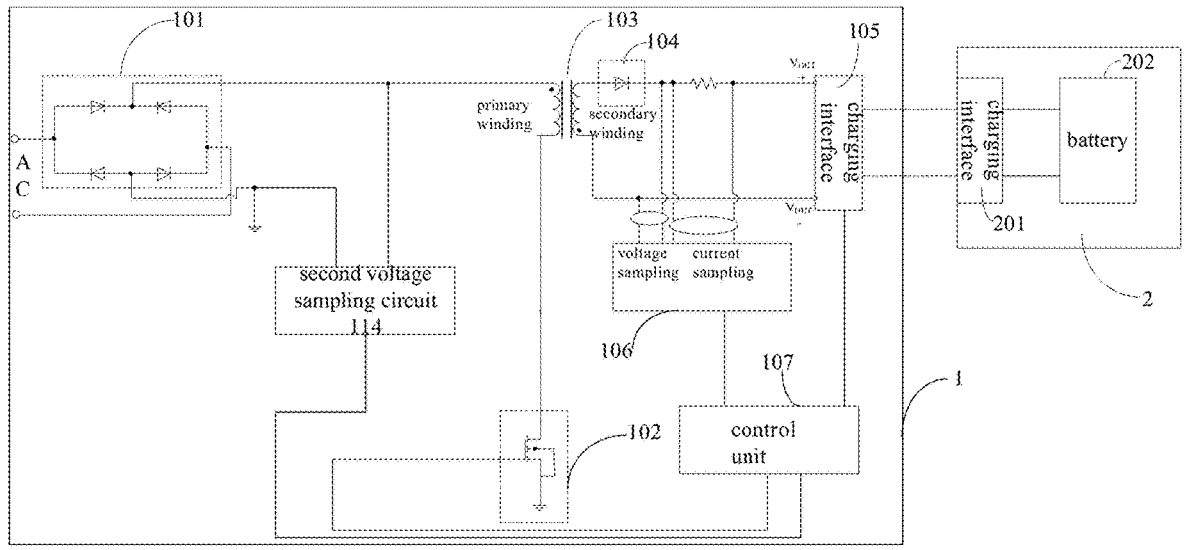
FIG. 12 is a schematic diagram illustrating a charging system according to still yet another embodiment of the present disclosure.

According to an embodiment of the present disclosure, as illustrated in FIG. 12, the power adapter 1 further includes a second voltage sampling circuit 114. The second voltage sampling circuit 114 is configured to sample the first voltage with the first pulsating waveform. The second voltage sampling circuit 114 is coupled to the control unit 107. When the voltage value sampled by the second voltage sampling circuit 114 is greater than a first predetermined voltage value, the control unit 104 controls the switch unit 102 to switch on for a predetermined time period, for performing a discharge on the surge voltage, spike voltage and the like in the first pulsating waveform.

As illustrated in FIG. 12, the second voltage sampling circuit 114 can be coupled to the first output end and the second output end of the first rectifier 101, so as to sample the first voltage with the first pulsating waveform. The control unit 107 performs a determination on the voltage value sampled by the second voltage sampling circuit 114. When the voltage value sampled by the second voltage sampling circuit 114 is greater than the first predetermined voltage value, it indicates that the power adapter 1 is disturbed by lightning stroke and the surge voltage is generated. At this time, a leakage is required for the surge voltage to ensure the safety and reliability of charging. The control unit 107 controls the switch unit 102 to switch on for a certain time period, to form a leakage circuit, such that the leakage is performed on the surge voltage caused by lightning stroke, thus avoiding the disturbance caused by the lightning stroke when the power adapter charges the terminal, and effectively improving the safety and reliability of the charging of the terminal. The first predetermined voltage value may be determined according to actual situations.

In an embodiment of the present disclosure, during a process that the power adapter 1 charges the battery 202 in the terminal 2, the control unit 107 is further configured to control the switch unit 102 to switch off when the voltage value sampled by the sampling unit 106 is greater than a second predetermined voltage value. Namely, the control unit 107 further performs a determination on the voltage value sampled by the sampling unit 106. When the voltage value sampled by the sampling unit 106 is greater than the second predetermined voltage value, it indicates that the voltage outputted by the power adapter 1 is too high. At this time, the control unit 107 controls the power adapter 1 to stop charging the battery 202 in the terminal 2 by controlling the switch unit 102 to switch off. In other words, the control unit 107 realizes the over-voltage protection of the power adapter 1 by controlling the switch unit 102 to switch off, thus ensuring the safety of charging.

Certainly, in an embodiment of the present disclosure, the controller 204 obtains the voltage value sampled by the sampling unit 106 by performing a bidirectional communication with the control unit (FIG. 13 and FIG. 14), and controls the charging control switch 203 to switch off when the voltage value sampled by the sampling unit 106 is greater than the second predetermined voltage value. Namely, the charging control switch 203 is controlled to switch off at the terminal 2 side, so as to stop the charging process of the battery 202, such that the safety of charging can be ensured.

Further, the control unit 107 is further configured to control the switch unit 102 to switch off when the current value sampled by the sampling unit 106 is greater than a predetermined current value. In other words, the control unit 107 further performs a determination on the current value sampled by the sampling unit 106. When the current value sampled by the sampling unit 106 is greater than the predetermined current value, it indicates that the current outputted by the power adapter 1 is too high. At this time, the control unit 107 controls the power adapter 1 to stop charging the terminal by controlling the switch unit 102 to switch off. In other words, the control unit 107 realizes the over-current protection of the power adapter 1 by controlling the switch unit 102 to switch off, thus ensuring the safety of charging.

Similarly, the controller 204 obtains the current value sampled by the sampling unit 106 by performing the bidirectional communication with the control unit 107 (FIG. 13 and FIG. 14), and controls the charging control switch to switch off when the current value sampled by the sampling unit 106 is greater than the predetermined current value. In other words, the charging control switch 203 is controlled to be switched off at the terminal side, so as to stop the charging process of the battery 202, thus ensuring the safety of charging.

The second predetermined voltage value and the predetermined current value may be set or written into a storage of the control unit (for example, the control unit 107 of the power adapter 1, for example the microcontroller MCU) according to actual situations.

In embodiments of the present disclosure, the terminal may be a mobile terminal, such as a mobile phone, a mobile power supply such as a power bank, a multimedia player, a notebook PC, a wearable device or the like.

According to the charging system of embodiments of the present disclosure, the power adapter is controlled to output the third voltage with the third pulsating waveform, and the third voltage with the third pulsating waveform outputted by the power adapter is directly applied to the battery of the terminal, thus realizing fast charging to the battery directly by the ripple output voltage/current. In contrast to the conventional constant voltage and constant current, a magnitude of the ripple output voltage/current changes periodically, such that a lithium precipitation of the lithium battery may be reduced, the service life of the battery may be improved, and a probability and intensity of arc discharge of a contact of a charging interface may be reduced, the service life of the charging interface may be prolonged, and it is beneficial to reduce polarization effect of the battery, improve charging speed, and decrease heat emitted by the battery, thus ensuring a reliability and safety of the terminal during the charging. Moreover, since the power adapter outputs the voltage with the pulsating waveform, it is unnecessary to provide an electrolytic condenser in the power adapter, which not only realizes simplification and miniaturization of the power adapter, but also decreases cost greatly. Moreover, with a switching between tow current sampling modes of the first current sampling circuit, a compatibility of detection accuracy and dynamic range of the current detection function can be ensured, and the application range can be extended.

Moreover, embodiments of the present disclosure provide a charging system. The charging system includes a terminal and a power adapter described above. The power adapter is configured to charge the terminal.

According to the charging system of embodiments of the present disclosure, by charging the terminal with the power adapter described above, the first capacitor bank is isolated when the output current of the power adapter is at the rising edge or the falling edge, thus preventing the power adapter from intense charging and discharging, which may effectively reduce the temperature rising, and prolong the service life. Moreover, the first capacitor bank is configured to only support the second charging mode of low power, and thus the first capacitor bank does not need to have a large capacitance value, which reduces the number and volume of capacitors, saves the volume of the power adapter, improves the power density and product expression, and is advantageous for miniaturization design of the power adapter.

Embodiments of the present disclosure provide a power adapter. The power adapter includes: a first rectifier, configured to rectify an input alternating current to output a first voltage with a first pulsating waveform; a switch unit, configured to modulate the first voltage according to a control signal to output a modulated first voltage; a transformer, configured to output a second voltage with a second pulsating waveform according to the modulated first voltage; a second rectifier, configured to rectify the second voltage to output a third voltage with a third pulsating waveform; a first charging interface, coupled to the second rectifier, and configured to apply the third voltage with the third pulsating waveform to a battery in a terminal via a second charging interface of the terminal when the first charging interface is coupled to the second charging interface, in which the second charging interface is coupled to the battery; a first current sampling circuit, configured to sample current outputted by the second rectifier to obtain a current sampling value, in which the first current sampling circuit has a first current sampling mode and a second current sampling mode; a selector switch unit, configured to control the first current sampling circuit to switch between the first current sampling mode and the second current sampling mode; a control unit, coupled to the first current sampling circuit, the selector switch unit, and the switch unit respectively, and configured to output the control signal to the switch unit, to control the first current sampling circuit to switch the current sampling mode by controlling the selector switch unit according to the charging mode, and to adjust a duty ratio of the control signal according to the current sampling value, such that the third voltage with the third pulsating waveform meets a charging requirement of the terminal.

According to the power adapter of embodiments of the present disclosure, the third voltage with the third pulsating waveform is outputted via the first charging interface, and the third voltage with the third pulsating waveform is directly applied to the battery of the terminal via the second charging interface of the terminal, thus realizing fast charging to the battery directly by the ripple output voltage/current. In contrast to the conventional constant voltage and constant current, a magnitude of the ripple output voltage/current changes periodically, such that a lithium precipitation of the lithium battery may be reduced, the service life of the battery may be improved, and a probability and intensity of arc discharge of a contact of a charging interface may be reduced, the service life of the charging interface may be prolonged, and it is beneficial to reduce polarization effect of the battery, improve charging speed, and decrease heat emitted by the battery, thus ensuring a reliability and safety of the terminal during the charging. Moreover, since the power adapter outputs the voltage with the pulsating waveform, it is unnecessary to provide an electrolytic condenser in the power adapter, which not only realizes simplification and miniaturization of the power adapter, but also decreases cost greatly. Moreover, with the switching between tow current sampling modes of the first current sampling circuit, a compatibility of detection accuracy and dynamic range of the current detection function can be ensured, and the application range can be extended.

Figure 15:
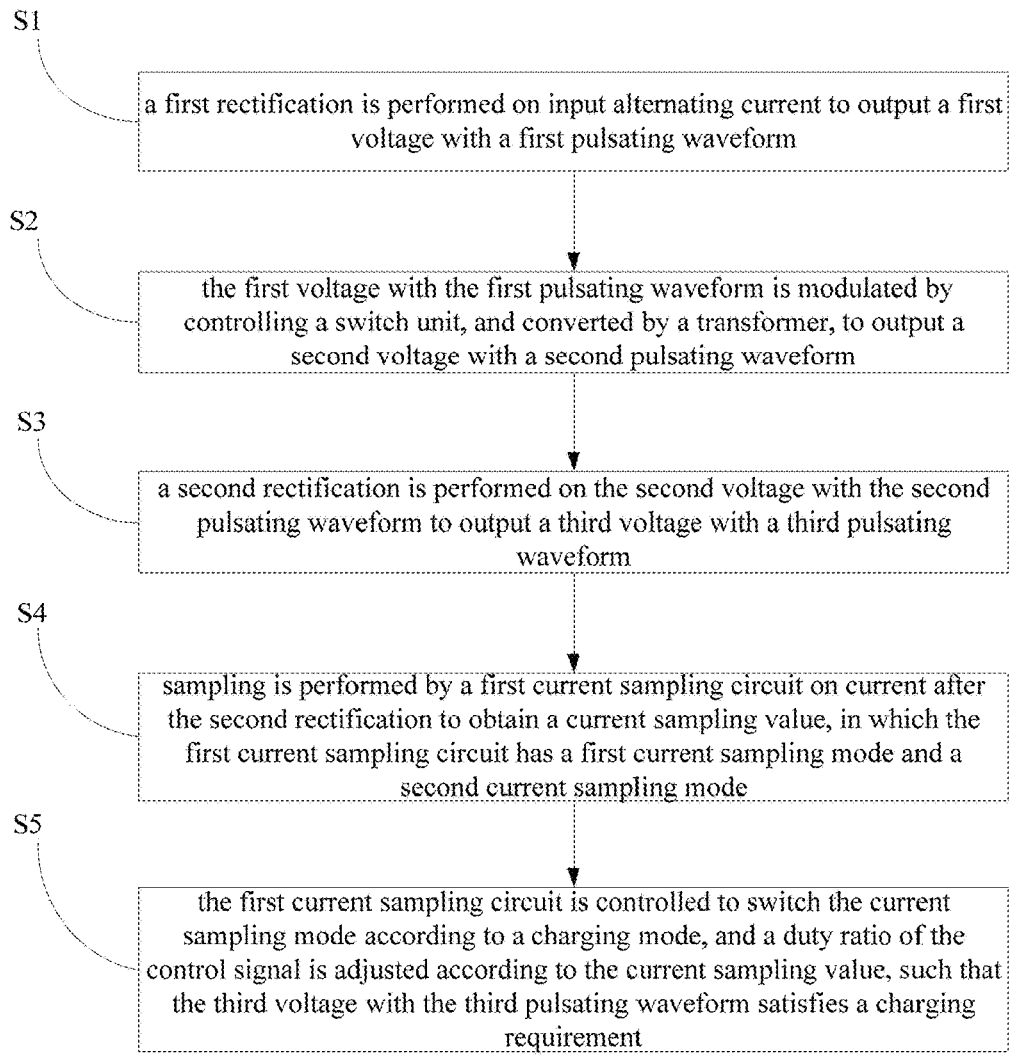
FIG. 15 is a flow chart of a charging method for a terminal according to embodiments of the present disclosure.

FIG. 15 is a flow chart of a charging method for a terminal according to embodiments of the present disclosure. As illustrated in FIG. 15, the charging method for the terminal includes the followings.

At block S1, when a first charging interface of a power adapter is coupled to a second charging interface of a terminal, a first rectification is performed on alternating current inputted into the power adapter to output a first voltage with a first pulsating waveform.

In other words, a first rectifier in the power adapter rectifies the inputted alternating current (i.e., the mains supply, such as alternating current of 220V, 50 Hz or 60 Hz) and outputs the first voltage (for example, 100 Hz or 120 Hz) with the first pulsating waveform, such as a voltage with a steamed bun waveform.

At block S2, the first voltage with the first pulsating waveform is modulated by a switch unit, and then is converted by a transformer to obtain a second voltage with a second pulsating waveform.

The switch unit may be formed of a MOS transistor. A PWM control is performed on the MOS transistor to perform a chopping modulation on the voltage with the steamed bun waveform. And then, the modulated first voltage is coupled to a secondary side by the transformer, such that the secondary winding outputs the second voltage with the second pulsating waveform.

In an embodiment of the present disclosure, a high-frequency transformer is used for conversion, such that the size of the transformer is small, thus realizing miniaturization of the power adapter with high-power.

At block S3, a second rectification is performed on the second voltage with the second pulsating waveform to output a third voltage with a third pulsating waveform. The third voltage with the third pulsating waveform may be applied to a battery of the terminal via the second charging interface, so as to charge the battery of the terminal.

In an embodiment of the present disclosure, the second rectification is performed by a second rectifier on the second voltage with the second pulsating waveform. The second rectifier may be formed of a diode or a MOS transistor, and can realize a secondary synchronous rectification, such that the third pulsating waveform keeps synchronous with the waveform of the modulated first voltage.

At block S4, a sampling is performed by a first current sampling circuit on the current outputted after the second rectification to obtain a current sampling value, in which the first current sampling circuit has a first current sampling mode and a second current sampling mode.

At block S5, the first current sampling circuit is controlled to switch between current sampling modes according to the charging mode, and a duty ratio of the control signal is adjusted according to the current sampling value, such that the third voltage with the third pulsating waveform satisfies a charging requirement.

According to an embodiment of the present disclosure, a frequency of the control signal is further adjusted according to the current sampling value.

In addition, the voltage after the second rectification is sampled to obtain a voltage sampling value, and the duty ratio of the control signal for controlling the switch unit is adjusted according to the voltage sampling value and/or current sampling value, such that the third voltage with the third pulsating waveform meets the charging requirement.

It should be noted that, the third voltage with the third pulsating waveform meeting the charging requirement means that, the third voltage and current with the third pulsating waveform need to meet the charging voltage and charging current when the battery is charged. In other words, the duty ratio of the control signal (such as a PWM signal) is adjusted according to the voltage and/or current outputted by the power adapter, so as to adjust the output of the power adapter in real time and realize a closed-loop adjusting control, such that the third voltage with the third pulsating waveform meets the charging requirement of the terminal, thus ensuring the stable and safe charging of the battery. In detail, a waveform of a charging voltage outputted to a battery is illustrated in FIG. 3, in which the waveform of the charging voltage is adjusted according to the duty ratio of the PWM signal. A waveform of a charging current outputted to a battery is illustrated in FIG. 4A, in which the waveform of the charging current is adjusted according to the duty ratio of the PWM signal.

In an embodiment of the present disclosure, by controlling the switch unit, a chopping modulation is directly performed on the first voltage with the first pulsating waveform i.e., the steamed bun waveform after a full-bridge rectification, and then a modulated voltage is sent to the high-frequency transformer and is coupled from the primary side to the secondary side via the high-frequency transformer, and then is changed back to the voltage/current with the steamed bun waveform or with the trapezoidal waveform after a synchronous rectification. The voltage/current with the steamed bun waveform or with the trapezoidal waveform is directly transmitted to the battery so as to realize second charging to the battery. The magnitude of the voltage with the steamed bun waveform/trapezoidal waveform may be adjusted according to the duty ratio of the PWM signal, such that the output of the power adapter may meet the charging requirement of the battery. It can be seen from that, electrolytic condensers at the primary side and the secondary side in the power adapter can be removed, and the battery can be directly charged via the voltage with the steamed bun waveform/trapezoidal waveform, such that a size of the power adapter may be reduced, thus realizing miniaturization of the power adapter, and decreasing cost greatly.

In an embodiment of the present disclosure, when the bidirectional communication is performed with the terminal via the data wire in the first charging interface to determine whether to charge the terminal in the first charging mode, the first current sampling circuit is controlled to be in the first current sampling mode. When the bidirectional communication is performed with the terminal via the data wire in the first charging interface to determine whether to charge the terminal in the second charging mode, the first current sampling circuit is controlled to be in the second current sampling mode.

According to an embodiment of the present disclosure, a frequency of the control signal is adjusted according to the voltage sampling value and/or the current sampling value. That is, the output of the PWM signal to the switch unit is controlled to maintain for a continuous time period, and then stop for a predetermined time period and then restart. In this way, the voltage applied to the battery is intermittent, thus realizing the intermittent charging of the battery, which avoids a safety hazard caused by heating phenomenon occurring when the battery is charged continuously and improves the reliability and safety of the charging to the battery. The control signal outputted to the switch unit is illustrated in FIG. 5.

Further, the above charging method includes: performing a communication with the terminal via the first charging interface to obtain status information of the terminal, and adjusting the duty ratio of the control signal according to the status information of the terminal, the voltage sampling value and/or current sampling value.

In other words, when the second charging interface is coupled to the first charging interface, the power adapter and the terminal may send communication query instructions to each other, and a communication connection can be established between the power adapter and the terminal after corresponding reply instructions are received, such that the power adapter can obtain the status information of the terminal, negotiates with the terminal about the charging mode and the charging parameter (such as the charging current, the charging voltage) and controls the charging process.

According to an embodiment of the present disclosure, a fourth voltage with a fourth pulsating waveform can be generated by a conversion of the transformer, and the fourth voltage with the fourth pulsating waveform can be detected to generate a voltage detecting value, and the duty ratio of the control signal can be adjusted according to the voltage detecting value.

In detail, the transformer can be provided with an auxiliary winding. The auxiliary winding can generate the fourth voltage with the fourth pulsating waveform according to the modulated first voltage. The output voltage of the power adapter can be reflected by detecting the fourth voltage with the fourth pulsating waveform, and the duty ratio of the control signal can be adjusted according to the voltage detecting value, such that the output of the power adapter meets the charging requirement of the battery.

In an embodiment of the present disclosure, sampling the voltage after the second rectification to obtain the voltage sampling value including: sampling and holding a peak value of the voltage after the second rectification, and sampling a zero crossing point of the voltage after the second rectification; performing a leakage on a peak voltage sampling and holding unit configured for sampling and holding the peak voltage at the zero crossing point; and sampling the peak voltage in the peak voltage sampling and holding unit so as to obtain the voltage sampling value. In this way, an accurate sampling can be performed on the voltage outputted by the power adapter, and it can be guaranteed that the voltage sampling value keeps synchronous with the first voltage with the first pulsating waveform, i.e., the phase and variation trend of magnitude of the voltage sampling value are consistent with those of the first voltage respectively.

Further, in an embodiment of the present disclosure, the above charging method includes: sampling the first voltage with the first pulsating waveform, and controlling the switch unit to switch on for a predetermined time period for performing a discharge on surge voltage in the first voltage with the first pulsating waveform when a sampled voltage value is greater than a first predetermined voltage value.

The first voltage with the first pulsating waveform is sampled so as to determine the sampled voltage value. When the sampled voltage value is greater than the first predetermined voltage value, it indicates that the power adapter is disturbed by lightning stroke and the surge voltage is generated. At this time, a leakage is required for the surge voltage to ensure the safety and reliability of charging. It is required to control the switch unit to switch on for a certain time period, to form a leakage circuit, such that the leakage is performed on the surge voltage caused by lightning stroke, thus avoiding the disturbance caused by the lightning stroke when the power adapter charges the terminal, and effectively improving the safety and reliability of the charging of the terminal. The first predetermined voltage value may be determined according to actual situations.

According an embodiment of the present disclosure, a communication with the terminal is performed via the first charging interface to determine the charging mode. When the charging mode is determined as the first charging mode, the charging current and/or charging voltage corresponding to the first charging mode can be obtained according to the status information of the terminal, so as to adjust the duty ratio of the control signal according to the charging current and/or charging voltage corresponding to the first charging mode. The charging mode includes the second charging mode and the first charging mode.

In other words, when the current charging mode is determined as the first charging mode, the charging current and/or charging voltage corresponding to the first charging mode can be obtained according to the status information of the terminal, such as the voltage, electric quantity, temperature of the battery, running parameters of the terminal and power consumption information of applications running on the terminal or the like. And the duty ratio of the control signal is adjusted according to the obtained charging current and/or charging voltage, such that the output of the power adapter meets the charging requirement, thus realizing the fast charging of the terminal.

The status information of the terminal includes the temperature of the battery. When the temperature of the battery is greater than a first predetermined temperature threshold, or the temperature of the battery is less than a second predetermined temperature threshold, if the current charging mode is the first charging mode, the first charging mode is switched to the second charging mode. The first predetermined temperature threshold is greater than the second predetermined temperature threshold. In other words, when the temperature of the battery is too low (for example, corresponding to less than the second predetermined temperature threshold) or too high (for example, corresponding to greater than the first predetermined temperature threshold), it is unsuitable to perform the fast charging, such that it needs to switch from the first charging mode to the second charging mode. In embodiments of the present disclosure, the first predetermined temperature threshold and the second predetermined temperature threshold can be set according to actual situations.

In an embodiment of the present disclosure, the switch unit is controlled to switch off when the temperature of the battery is greater than a predetermined high temperature protection threshold. Namely, when the temperature of the battery exceeds the high temperature protection threshold, it needs to apply a high temperature protection strategy to control the switch unit to switch off, such that the power adapter stops charging the battery, thus realizing the high protection of the battery and improving the safety of charging. The high temperature protection threshold may be different from or the same to the first temperature threshold. In an embodiment, the high temperature protection threshold is greater than the first temperature threshold.

In another embodiment of the present disclosure, the terminal further obtains the temperature of the battery, and controls to stop charging the battery (for example by controlling a charging control switch to switch off at the terminal side) when the temperature of the battery is greater than the predetermined high temperature protection threshold, so as to stop the charging process of the battery and to ensure the safety of charging.

Moreover, in an embodiment of the present disclosure, the charging method further includes: obtaining a temperature of the first charging interface, and controlling the switch unit to switch off when the temperature of the first charging interface is greater than a predetermined protection temperature. In other words, when the temperature of the charging interface exceeds a certain temperature, the control unit needs to apply the high temperature protection strategy to control the switch unit to switch off, such that the power adapter stops charging the battery, thus realizing the high protection of the battery and improving the safety of charging.

Certainly, in another embodiment of the present disclosure, the terminal obtains the temperature of the first charging interface by performing the bidirectional communication with the power adapter via the second charging interface. When the temperature of the first charging interface is greater than the predetermined protection temperature, the terminal controls the charging control switch to switch off, i.e., the charging control switch can be switched off at the terminal side, so as to stop the charging process of the battery, thus ensuring the safety of charging.

During a process that the power adapter charges to the terminal, the switch unit is controlled to switch off when the voltage sampling value is greater than a second predetermined voltage value. Namely, a determination is performed on the voltage sampling value during the process that the power adapter charges the terminal. When the voltage sampling value is greater than the second predetermined voltage value, it indicates that the voltage outputted by the power adapter is too high. At this time, the power adapter is controlled to stop charging the terminal by controlling the switch unit to switch off. In other words, the over-voltage protection of the power adapter is realized by controlling the switch unit to switch off, thus ensuring the safety of charging.

Certainly, in an embodiment of the present disclosure, the terminal obtains the voltage sampling value by performing a bidirectional communication with the power adapter via the second charging interface, and controls to stop charging the battery when the voltage sampling value is greater than the second predetermined voltage value. Namely, the charging control switch is controlled to switch off at the terminal side, so as to stop the charging process, such that the safety of charging can be ensured.

In an embodiment of the present disclosure, during the process that the power adapter charges to the terminal, the switch unit is controlled to switch off when the current sampling value is greater than a predetermined current value. In other words, during the process that the power adapter charges to the terminal, a determination is performed on the current sampling value. When the current sampling value is greater than the predetermined current value, it indicates that the current outputted by the power adapter is too high. At this time, the power adapter is controlled to stop charging the terminal by controlling the switch unit to switch off. In other words, the over-current protection of the power adapter is realized by controlling the switch unit to switch off, thus ensuring the safety of charging.

Similarly, the terminal obtains the current sampling value by performing the bidirectional communication with the power adapter via the second charging interface, and controls to stop charging the battery when the current sampling value is greater than the predetermined current value. In other words, the charging control switch is controlled to be switched off at the terminal side, such that the charging process of the battery is stopped, thus ensuring the safety of charging.

The second predetermined voltage value and the predetermined current value may be set according to actual situations.

In embodiments of the present disclosure, the status information of the terminal includes the electric quantity of the battery, the temperature of the battery, the voltage/current of the battery of the terminal, interface information of the terminal and information on a path impedance of the terminal.

In detail, the power adapter can be coupled to the terminal via a universal serial bus (USB) interface. The USB interface may be a general USB interface, or a micro USB interface. A data wire in the USB interface is configured as the data wire in the first charging interface, and configured for the bidirectional communication between the power adapter and the terminal. The data wire may be D+ and/or D− wire in the USB interface. The bidirectional communication may refer to an information interaction performed between the power adapter and the terminal.

The power adapter performs the bidirectional communication with the terminal via the data wire in the USB interface, so as to determine to charge the terminal in the first charging mode.

Alternatively, as an embodiment, when the power adapter performs the bidirectional communication with the terminal via the first charging interface so as to determine to charge the terminal in the first charging mode, the power adapter sends a first instruction to the terminal. The first instruction is configured to query the terminal whether to operate in the first charging mode. The power adapter receives a first reply instruction from the terminal. The first reply instruction is configured to indicate that the terminal agrees to operate in the first charging mode.

Alternatively, as an embodiment, before the power adapter sends the first instruction to the terminal, the power adapter charges the terminal in the second charging mode. When the power adapter determines that a charging duration of the second charging mode is greater than a predetermined threshold, the power adapter sends the first instruction to the terminal.

It should be understood that, when the power adapter determines that a charging duration of the second charging mode is greater than a predetermined threshold, the power adapter may determine that the terminal has identified it as a power adapter, such that the second charging query communication may start.

Alternatively, as an embodiment, the power adapter is controlled to adjust a charging current to a charging current corresponding to the first charging mode by controlling the switch unit. Before the power adapter charges the terminal with the charging current corresponding to the first charging mode, a bidirectional communication is performed with the terminal via the first charging interface to determine a charging voltage corresponding to the first charging mode, and the power adapter is controlled to adjust a charging voltage to the charging voltage corresponding to the first charging mode.

Alternatively, as an embodiment, performing the bidirectional communication with the terminal via the first charging interface to determine the charging voltage corresponding to the first charging mode includes: sending by the power adapter a second instruction to the terminal, receiving by the power adapter a second reply instruction sent from the terminal, and determining by the power adapter the charging voltage corresponding to the first charging mode according to the second reply instruction. The second instruction is configured to query whether a current output voltage of the power adapter is suitable for being used as the charging voltage corresponding to the first charging mode. The second reply instruction is configured to indicate that the current output voltage of the power adapter is suitable, high or low.

Alternatively, as an embodiment, before controlling the power adapter to adjust the charging current to the charging current corresponding to the first charging mode, the charging current corresponding to the first charging mode is determined by performing the bidirectional communication with the terminal via the first charging interface.

Alternatively, as an embodiment, determining the charging current corresponding to the first charging mode by performing the bidirectional communication with the terminal via the first charging interface includes: sending by the power adapter a third instruction to the terminal, receiving by the power adapter a third reply instruction sent from the terminal and determining by the power adapter the charging current corresponding to the first charging mode according to the third reply instruction. The third instruction is configured to query a maximum charging current supported by the terminal. The third reply instruction is configured to indicate the maximum charging current supported by the terminal.

The power adapter may determine the above maximum charging current as the charging current corresponding to the first charging mode, or may set the charging current as a charging current less than the maximum charging current.

Alternatively, as an embodiment, during the process that the power adapter charges the terminal in the first charging mode, the bidirectional communication is performed with the terminal via the first charging interface, so as to continuously adjust a charging current outputted to the battery from the power adapter by controlling the switch unit.

The power adapter may query the status information of the terminal continuously, so as to adjust the charging current continuously, for example, query the voltage of the battery of the terminal, the electric quantity of the battery, etc.

Alternatively, as an embodiment, performing the bidirectional communication with the terminal via the first charging interface to continuously adjust the charging current outputted to the battery from the power adapter by controlling the switch unit includes: sending by the power adapter a fourth instruction to the terminal, receiving by the power adapter a fourth reply instruction sent by the terminal, and adjusting the charging current by controlling the switch unit according to the current voltage of the battery. The fourth instruction is configured to query a current voltage of the battery in the terminal. The fourth reply instruction is configured to indicate the current voltage of the battery in the terminal.

Alternatively, as an embodiment, adjusting the charging current by controlling the switch unit according to the current voltage of the battery includes: adjusting the charging current outputted to the battery from the power adapter to a charging current value corresponding to the current voltage of the battery by controlling the switch unit according to the current voltage of the battery and a predetermined correspondence between battery voltage values and charging current values.

In detail, the power adapter may store the correspondence between battery voltage values and charging current values in advance.

Alternatively, as an embodiment, during the process that the power adapter charges the terminal in the first charging mode, it is determined whether there is a poor contact between the first charging interface and the second charging interface by performing the bidirectional communication with the terminal via the first charging interface. When it is determined that there is the poor contact between the first charging interface and the second charging interface, the power adapter is controlled to quit the first charging mode.

Alternatively, as an embodiment, before determining whether there is the poor contact between the first charging interface and the second charging interface, the power adapter receives information indicating a path impedance of the terminal from the terminal. The power adapter sends a fourth instruction to the terminal. The fourth instruction is configured to query a current voltage of the battery in the terminal. The power adapter receives a fourth reply instruction sent by the terminal. The fourth reply instruction is configured to indicate the current voltage of the battery in the terminal. The power adapter determines a path impedance from the power adapter to the battery according to an output voltage of the power adapter and the current voltage of the battery and determines whether there is the poor contact between the first charging interface and the second charging interface according to the path impedance from the power adapter to the battery, the path impedance of the terminal, and a path impedance of a charging wire between the power adapter and the terminal.

Alternatively, as an embodiment, before the power adapter is controlled to quit the first charging mode, a fifth instruction is sent to the terminal. The fifth instruction is configured to indicate that there is the poor contact between the first charging interface and the second charging interface.

After sending the fifth instruction, the power adapter may quit the first charging mode or reset.

The fast charging process according to embodiments of the present disclosure is described from the perspective of the power adapter, and then the fast charging process according to embodiments of the present disclosure will be described from the perspective of the terminal in the following.

In embodiments of the present disclosure, the terminal supports the first charging mode and the second charging mode. The charging current of the first charging mode is greater than that of the second charging mode. The terminal performs the bidirectional communication with the power adapter via the second charging interface such that the power adapter determines to charge the terminal in the first charging mode. The power adapter outputs according to a charging current corresponding to the first charging mode, for charging the battery in the terminal.

Alternatively, as an embodiment, performing by the terminal the bidirectional communication with the power adapter via the second charging interface such that the power adapter determines to charge the terminal in the first charging mode includes: receiving by the terminal the first instruction sent by the power adapter, in which the first instruction is configured to query the terminal whether to operate in the first charging mode; sending by the terminal a first reply instruction to the power adapter. The first reply instruction is configured to indicate that the terminal agrees to operate in the first charging mode.

Alternatively, as an embodiment, before the terminal receives the first instruction sent by the power adapter, the battery in the terminal is charged by the power adapter in the second charging mode. When the power adapter determines that a charging duration of the second charging mode is greater than a predetermined threshold, the terminal receives the first instruction sent by the power adapter.

Alternatively, as an embodiment, before the power adapter outputs according to the charging current corresponding to the first charging mode for charging the battery in the terminal, the terminal performs the bidirectional communication with the power adapter via the second charging interface, such that the power adapter determines the charging voltage corresponding to the first charging mode.

Alternatively, as an embodiment, performing by the terminal the bidirectional communication with the power adapter via the second charging interface such that the power adapter determines the charging voltage corresponding to the first charging mode includes: receiving by the terminal a second instruction sent by the power adapter, and sending by the terminal a second reply instruction to the power adapter. The second instruction is configured to query whether a current output voltage of the power adapter is suitable for being used as the charging voltage corresponding to the first charging mode. The second reply instruction is configured to indicate that the current output voltage of the power adapter is suitable, high or low.

Alternatively, as an embodiment, before the terminal receives the charging current corresponding to the first charging mode from the power adapter for charging the battery in the terminal, the terminal performs the bidirectional communication with the power adapter via the second charging interface, such that the power adapter determines the charging current corresponding to the first charging mode.

Performing by the terminal the bidirectional communication with the power adapter via the second charging interface such that the power adapter determines the charging current corresponding to the first charging mode includes: receiving by the terminal a third instruction sent by the power adapter, in which the third instruction is configured to query a maximum charging current supported by the terminal; sending by the terminal a third reply instruction to the power adapter, in which the third reply instruction is configured to indicate the maximum charging current supported by the terminal, such that the power adapter determines the charging current corresponding to the first charging mode according to the maximum charging current.

Alternatively, as an embodiment, during a process that the power adapter charges the terminal in the first charging mode, the terminal performs the bidirectional communication with the power adapter via the second charging interface, such that the power adapter continuously adjusts a charging current outputted to the battery.

Performing by the terminal the bidirectional communication with the power adapter via the second charging interface such that the power adapter continuously adjusts a charging current outputted to the battery includes: receiving by the terminal a fourth instruction sent by the power adapter, in which the fourth instruction is configured to query a current voltage of the battery in the terminal; sending by the terminal a fourth reply instruction to the power adapter, in which the fourth reply instruction is configured to indicate the current voltage of the battery in the terminal, such that the power adapter continuously adjusts the charging current outputted to the battery according to the current voltage of the battery.

Alternatively, as an embodiment, during the process that the power adapter charges the terminal in the first charging mode, the terminal performs the bidirectional communication with the control unit, such that the power adapter determines whether there is a poor contact between the first charging interface and the second charging interface.

Performing by the terminal the bidirectional communication with the power adapter, such that the power adapter determines whether there is the poor contact between the first charging interface and the second charging interface includes: receiving by the terminal a fourth instruction sent by the power adapter, in which the fourth instruction is configured to query a current voltage of the battery in the terminal; sending by the terminal a fourth reply instruction to the power adapter, in which the fourth reply instruction is configured to indicate the current voltage of the battery in the terminal, such that the power adapter determines whether there is the poor contact between the first charging interface and the second charging interface according to an output voltage of the power adapter and the current voltage of the battery.

Alternatively, as an embodiment, the terminal receives a fifth instruction sent by the power adapter. The fifth instruction is configured to indicate that there is the poor contact between the first charging interface and the second charging interface.

In order to initiate and adopt the first charging mode, the power adapter may perform a second charging communication procedure with the terminal, for example, by one or more handshakes, so as to realize the fast charging of battery. Referring to FIG. 6, the fast charging communication procedure according to embodiments of the present disclosure and respective stages in the fast charging process will be described in detail. It should be understood that, communication actions or operations illustrated in FIG. 6 are merely exemplary. Other operations or various modifications of respective operations in FIG. 6 can be implemented in embodiments of the present disclosure. In addition, respective stages in FIG. 6 may be executed in an order different from that illustrated in FIG. 6, and it is unnecessary to execute all the operations illustrated in FIG. 6. It should be noted that, a curve in FIG. 6 represents a variation trend of a peak value or a mean value of the charging current, rather than a curve of actual charging current.

In conclusion, with the charging method according to embodiments of the present disclosure, the power adapter is controlled to output the third voltage with the third pulsating waveform which meets the charging requirement, and the third voltage with the third pulsating waveform outputted by the power adapter is directly applied to the battery of the terminal, thus realizing second charging to the battery directly by the ripple output voltage/current. In contrast to the conventional constant voltage and constant current, a magnitude of the ripple output voltage/current changes periodically, such that a lithium precipitation of the lithium battery may be reduced, the service life of the battery may be improved, and a probability and intensity of arc discharge of a contact of a charging interface may be reduced, the service life of the charging interface may be prolonged, and it is beneficial to reduce polarization effect of the battery, improve charging speed, and decrease heat emitted by the battery, thus ensuring a reliability and safety of the terminal during the charging. Moreover, since the power adapter outputs the voltage with the pulsating waveform, it is unnecessary to provide an electrolytic condenser in the power adapter, which not only realizes simplification and miniaturization of the power adapter, but also decreases cost greatly. Moreover, with the switching between tow current sampling modes of the first current sampling circuit, a compatibility of detection accuracy and dynamic range of the current detection function can be ensured, and the application range can be extended.

Figure 16:
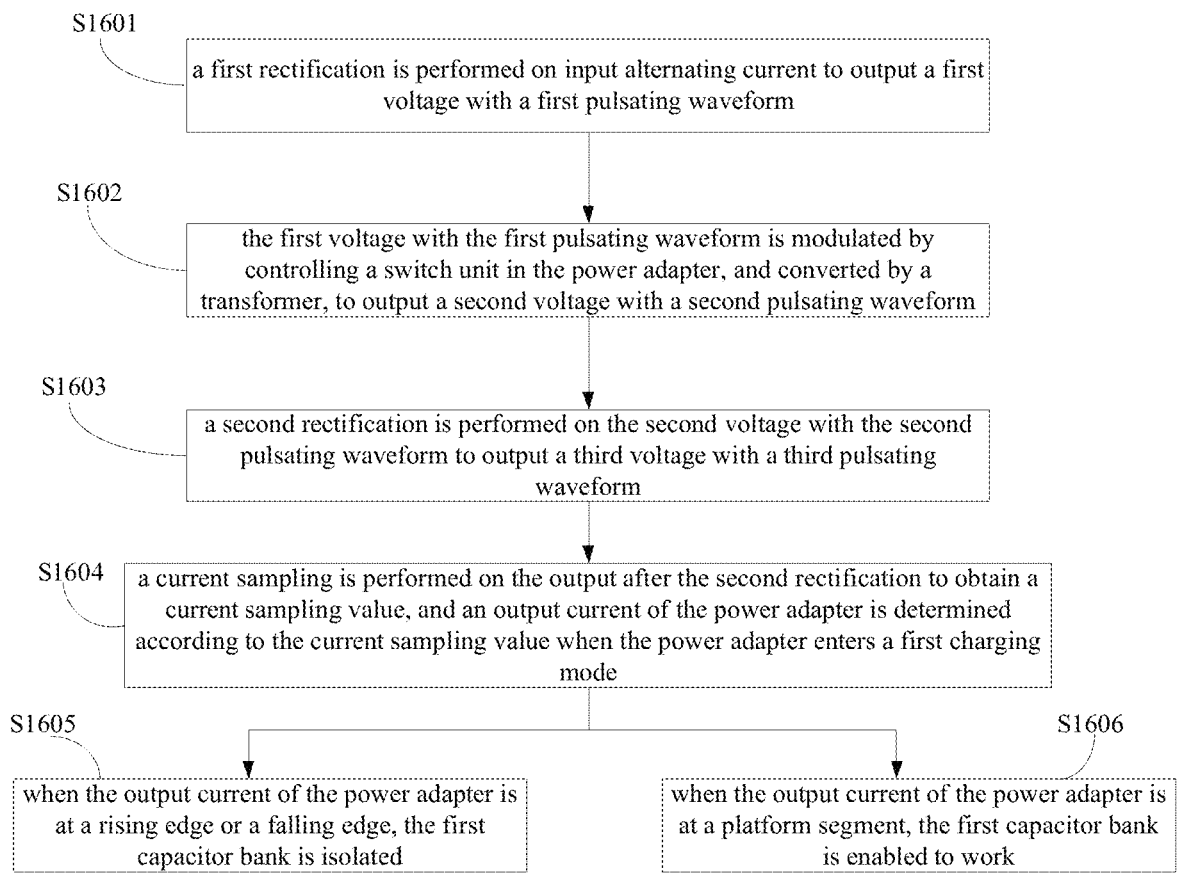
FIG. 16 is a flow chart of a charging method for a terminal according to an embodiment of the present disclosure.

According to an embodiment of the present disclosure, a charging method for a terminal is further provided. The terminal is charged by a power adapter, and a first capacitor bank and a second capacitor bank are coupled at a secondary side of the power adapter. As illustrated in FIG. 16, the charging method includes followings.

At block S1601, a first rectification is performed on input alternating current to output a first voltage with a first pulsating waveform.

At block S1602, the first voltage with the first pulsating waveform is modulated by controlling a switch unit in the power adapter, and converted by a transformer to output a second voltage with a second pulsating waveform.

At block S1603, a second rectification is performed on the second voltage with the second pulsating waveform to output a third voltage with a third pulsating waveform.

At block S1604, a current sampling is performed on an output after the second rectification to obtain a current sampling value, and an output current of the power adapter is determined according to the current sampling value when the power adapter enters a first charging mode.

At block S1605, the first capacitor bank is isolated when the output current of the power adapter is at a rising edge or a falling edge.

At block S1606, the first capacitor bank is enabled to work when the output current of the power adapter is at a platform segment.

By controlling the power adapter, the waveform of the output current of the power adapter can be adjusted, such that the current waveform of the power adapter is like the trapezoidal waveform, as illustrated in FIG. 2C. In embodiments of the present disclosure, the output current of the power adapter being at the platform segment refers to that, the waveform of the output current of the power adapter is at a stable and unchanging stage of the trapezoidal waveform.

When the output current of the power adapter is at the platform segment, the first capacitor bank is put in circuit. In this case, the first capacitor bank cannot perceive external AC frequency ripple, and merely absorb high-frequency switch ripple, thus ensuring that the temperature rising of the first capacitor bank 115 may not be too high, and moreover improving filtering effect.

According to an embodiment of the present disclosure, the first capacitor bank includes a plurality of solid capacitors coupled in parallel, and the second capacitor bank includes a plurality of ceramic capacitors coupled in parallel.

Moreover, the power adapter further includes a selector switch. A first end of the selector switch is coupled to the first capacitor bank, a second end of the selector switch is grounded, and a control end of the selector switch is coupled to the control unit. When the output current of the power adapter is at the rising edge or the falling edge, the selector switch is controlled to switch off. When the output current of the power adapter is at the platform segment, the selector switch is controlled to switch on.

In other words, when the power adapter enters the first charging mode (i.e., the fast charging mode), the selector switch such as MOSFET is controlled. When the output current of the power adapter is at the rising edge or the falling edge, the MOSFET is switched off, such that cathodes of solid capacitors in the first capacitor bank are disconnected from the ground GND to isolate the solid capacitors, and the ceramic capacitors in the second capacitor bank play a role in the filtering. When the output current of the power adapter is at the platform segment, the MOSFET is switched on, such that the solid capacitors in the first capacitor bank put in circuit, and also play a role in the filtering.

Waveforms of a switch signal of the MOSFET and the output current of the power adapter are as illustrated in FIG. 2C, in which the MOSFET is switched on at high levels, and switched off at low levels.

In an embodiment of the present disclosure, when the power adapter enters the second charging mode, the first capacitor bank is enabled to work, in which a charging speed of the first charging mode is greater than a charging speed of the second charging mode.

In other words, when the power adapter enters the second charging mode (i.e., the normal charging mode), the selector switch such as the MOSFET is controlled, i.e., the MOSFET is switched on, to couple the cathodes of the solid capacitors in the first capacitor bank to ground GND, to enable the solid capacitors to work. In this case, the solid capacitors of the first capacitor bank and the ceramic capacitors of the second capacitor bank work simultaneously, and may provide a low-power 5V output. The solid capacitors mainly provide output power when the input voltage of the power adapter is at the valley. Since the output load of the power adapter is small, temperature rising of the solid capacitors is controllable. The ceramic capacitors of the second capacitor bank play a role in filtering out noise.

Therefore, in order to ensure that the power adapter can output direct current of 5V in the second charging mode, and can work with load, the solid capacitors of the first capacitor bank cannot be removed completely. In embodiments of the present disclosure, the power adapter adopts one MOSFET to enable the solid capacitors, such that the solid capacitors are in the working state when the power adapter is in the second charging mode, and are isolated when the output current of the power adapter is at the rising edge or the falling edge after the power adapter enters the first charging mode, thus preventing the solid capacitors from intense charging and discharge, and ensuring not too high temperature rising of the solid capacitors.

In an embodiment of the present disclosure, the power adapter further includes a first charging interface. The first charging interface includes a power wire and a data wire. The power wire is configured to charge the battery of the terminal. The data wire is configured to communicate with the terminal. When the first charging interface is coupled with the second charging interface, the charging mode is determined by communicating with the terminal, in which the charging mode includes the first charging mode and the second charging mode.

Moreover, when the power adapter enters the first charging mode, the power adapter applies the third voltage with the third pulsating waveform to the battery of the terminal via the second charging interface, in which the second charging interface is coupled with the battery.

According to the charging method for the terminal of embodiments of the present disclosure, by providing the first capacitor bank and the second capacitor bank at the secondary side of the power adapter, and by performing current sampling on the output of the secondary rectification to obtain the current sampling value, the output current of the power adapter is determined according to the current sampling value when the power adapter enters the first charging mode, in which, when the current of the power adapter is at the rising edge or the falling edge, the first capacitor bank is isolated, preventing the power adapter from intense charging and discharging, which may effectively reduce the temperature rising and prolong the service life; when the current of the power adapter is at the platform segment, the first capacitor bank is enabled to work, such that the first capacitor bank and the second capacitor bank work simultaneously, greatly improving the filtering effect, ensuring stable and reliable operation of the power adapter, and improving the charging effect.

In the specification of the present disclosure, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumference" refer to the orientations and location relations which are the orientations and location relations illustrated in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Those skilled in the art may be aware that, in combination with the examples described in the embodiments disclosed in this specification, units and algorithm steps can be implemented by electronic hardware, or a combination of computer software and electronic hardware. In order to clearly illustrate interchangeability of the hardware and software, components and steps of each example are already described in the description according to the function commonalties. Whether the functions are executed by hardware or software depends on particular applications and design constraint conditions of the technical solutions. Persons skilled in the art may use different methods to implement the described functions for each particular application, but it should not be considered that the implementation goes beyond the scope of the present disclosure.

Those skilled in the art may be aware that, with respect to the working process of the system, the device and the unit, reference is made to the part of description of the method embodiment for simple and convenience, which are described herein.

In embodiments of the present disclosure, it should be understood that, the disclosed system, device and method may be implemented in other way. For example, embodiments of the described device are merely exemplary. The partition of units is merely a logical function partitioning. There may be other partitioning ways in practice. For example, several units or components may be integrated into another system, or some features may be ignored or not implemented. Further, the coupling between each other or directly coupling or communication connection may be implemented via some interfaces. The indirect coupling or communication connection may be implemented in an electrical, mechanical or other manner.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, each functional unit in the present disclosure may be integrated in one progressing module, or each functional unit exists as an independent unit, or two or more functional units may be integrated in one module.

If the functions are embodied in software and sold or used as an independent product, it can be stored in the computer readable storage medium. Based on this, the technical solution of the present disclosure or a part making a contribution to the related art or a part of the technical solution may be embodied in a manner of software product. The computer software produce is stored in a storage medium, including some instructions for causing one computer device (such as a personal PC, a server, or a network device etc.) to execute all or some of steps of the method according to embodiments of the present disclosure. The above-mentioned storage medium may be a medium able to store program codes, such as, USB flash disk, mobile hard disk drive, read-only memory (ROM), random-access memory (RAM), a magnetic tape, a floppy disc, an optical data storage device, and the like.

Although explanatory embodiments have been illustrated and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power adapter, comprising:
    a first rectifier, configured to rectify input alternating current to output a first voltage with a first pulsating waveform;
    a switch unit, configured to modulate the first voltage with the first pulsating waveform according to a control signal;
    a transformer, configured to output a second voltage with a second pulsating waveform according to modulated first voltage with the first pulsating waveform;
    a second rectifier, configured to rectify the second voltage with the second pulsating waveform to output a third voltage with a third pulsating waveform;
    a first current sampling circuit, configured to perform a current sampling on the third voltage with the third pulsating waveform to obtain a current sampling value;
    a first capacitor bank and a second capacitor bank, each being coupled to an output end of the second rectifier; and
    a control unit, coupled to the first current sampling circuit and the switch unit respectively, and configured to output the control signal to the switch unit, and determine an output current of the power adapter according to the current sampling value when the power adapter enters a first charging mode, wherein,
    the control unit is configured to isolate the first capacitor bank when the output current of the power adapter is at a rising edge or a falling edge;
    the control unit is configured to enable the first capacitor bank to work when the output current of the power adapter is at a platform segment.

2. The power adapter according to claim 1, wherein the first capacitor bank comprises a plurality of solid capacitors coupled in parallel, and the second capacitor bank comprises a plurality of ceramic capacitors coupled in parallel.

3. The power adapter according to claim 1, further comprising a selector switch, wherein a first end of the selector switch is coupled to a first end of the first capacitor bank, a second end of the selector switch is grounded, a control end of the selector switch is coupled to the control unit, and a second end of the first capacitor bank is coupled to the output end of the second rectifier.

4. The power adapter according to claim 3, wherein
the control unit is configured to control the selector switch to switch off when the output current of the power adapter is at the rising edge or the falling edge;
the control unit is configured to control the selector switch to switch on when the output current of the power adapter is at the platform segment.

5. The power adapter according to claim 3, wherein the selector switch is a MOS transistor.

6. The power adapter according to claim 1, wherein the control unit is configured to enable the first capacitor bank to work when the power adapter enters a second charging mode, in which a charging speed of the first charging mode is greater than that of the second charging mode.

7. The power adapter according to claim 1, further comprising a first charging interface, wherein the first charging interface is coupled to an output end of the second rectifier, the first charging interface comprises a power wire and a data wire, the power wire is configured to charge a battery of a terminal, the data wire is configured to communicate with the terminal, the control unit is configured to determine a charging mode by communicating with the terminal when the first charging interface is coupled to a second charging interface of the terminal, in which the charging mode comprises the first charging mode and the second charging mode.

8. The power adapter according to claim 7, wherein, when the power adapter enters the first charging mode, the power adapter applies the third voltage with the third pulsating waveform to the battery of the terminal via the second charging interface, in which the second charging interface is coupled with the battery.

9. A charging system, comprising:
a terminal;
a power adapter, wherein the power adapter is configured to charge the terminal, and comprises:
a first rectifier, configured to rectify input alternating current to output a first voltage with a first pulsating waveform;
a switch unit, configured to modulate the first voltage with the first pulsating waveform according to a control signal;
a transformer, configured to output a second voltage with a second pulsating waveform according to modulated first voltage with the first pulsating waveform;
a second rectifier, configured to rectify the second voltage with the second pulsating waveform to output a third voltage with a third pulsating waveform;
a first current sampling circuit, configured to perform a current sampling on the third voltage with the third pulsating waveform to obtain a current sampling value;
a first capacitor bank and a second capacitor bank, each being coupled to an output end of the second rectifier; and
a control unit, coupled to the first current sampling circuit and the switch unit respectively, and configured to output the control signal to the switch unit, and determine an output current of the power adapter according to the current sampling value when the power adapter enters a first charging mode, wherein,
the control unit is configured to isolate the first capacitor bank when the output current of the power adapter is at a rising edge or a falling edge;
the control unit is configured to enable the first capacitor bank to work when the output current of the power adapter is at a platform segment.

10. A charging method for a terminal, wherein the terminal is charged by a power adapter, a first capacitor bank and a second capacitor bank are coupled at a secondary side of the power adapter, and the charging method comprises:
performing a first rectification on input alternating current to output a first voltage with a first pulsating waveform;
modulating the first voltage with the first pulsating waveform by controlling a switch unit in the power adapter, and outputting a second voltage with a second pulsating waveform by conversion of a transformer;
performing a second rectification on the second voltage with the second pulsating waveform to output a third voltage with a third pulsating waveform;
performing a current sampling on an output of the second rectification to obtain a current sampling value, and determining an output current of the power adapter according to the current sampling value when the power adapter enters a first charging mode;
isolating the first capacitor bank when the output current of the power adapter is at a rising edge or a falling edge;
enabling the first capacitor bank to work when the output current of the power adapter is at a platform segment.

11. The charging method according to claim 10, wherein the first capacitor bank comprises a plurality of solid capacitors coupled in parallel, and the second capacitor bank comprises a plurality of ceramic capacitors coupled in parallel.

12. The charging method according to claim 10, wherein the power adapter further comprises a selector switch, a first end of the selector switch is coupled to the first capacitor bank, a second end of the selector switch is grounded, and a control end of the selector switch is coupled to a control unit, wherein
the selector switch is controlled to switch off when the output current of the power adapter is at the rising edge or the falling edge;
the selector switch is controlled to switch on when the output current of the power adapter is at the platform segment.

13. The charging method according to claim 10, wherein the first capacitor bank is enabled to work when the power adapter enters a second charging mode, in which a charging speed of the first charging mode is greater than that of the second charging mode.

14. The charging method according to claim 10, wherein the power adapter further comprises a first charging interface, the first charging interface comprises a power wire and a data wire, the power wire is configured to charge a battery of the terminal, the data wire is configured to communicate with the terminal, a charging mode is determined by communication with the terminal when the first charging interface is coupled to a second charging interface of the terminal, in which the charging mode comprises the first charging mode and the second charging mode.

15. The charging method according to claim 14, wherein, when the power adapter enters the first charging mode, the power adapter applies the third voltage with the third pulsating waveform to the battery of the terminal via the second charging interface, in which the second charging interface is coupled with the battery.

16. The power adapter according to claim 7, wherein the first current sampling circuit has a first current sampling mode and a second current sampling mode, the control unit is further configured to control the first current sampling circuit to work in the first current sampling mode when the charging mode is determined as the first charging mode, and control the first current sampling circuit to work in the second current sampling mode when the charging mode is determined as the second charging mode.

17. The power adapter according to claim 1, wherein the control unit is further configured to adjust a duty ratio of the control signal according to the current sampling value, such that the third voltage with the third pulsating waveform satisfies a charging requirement.

18. The power adapter according to claim 17, wherein the control unit is further configured to adjust a frequency of the control signal according to the current sampling value.

19. The power adapter according to claim 7, wherein the control unit is further configured to obtain status information of the terminal when the power adapter is coupled to the terminal.

20. The power adapter according to claim 19, wherein the control unit is further configured to adjust a duty ratio of the control signal according to the current sampling value and the status information of the terminal.

* * * * *